US012757084B2

(12) United States Patent
Ramachandra et al.

(10) Patent No.: US 12,757,084 B2
(45) Date of Patent: Oct. 6, 2026

(54) MOBILITY-ENHANCED REPORTING OF SERVING CELLS

(71) Applicant: Telefonaktiebolaget LM Ericsson (publ), Stockholm (SE)

(72) Inventors: Pradeepa Ramachandra, Linköping (SE); Icaro Leonardo Da Silva, Solna (SE); Helka-Liina Määttänen, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 528 days.

(21) Appl. No.: 18/248,094

(22) PCT Filed: Oct. 22, 2021

(86) PCT No.: PCT/IB2021/059787

§ 371 (c)(1),
(2) Date: Apr. 6, 2023

(87) PCT Pub. No.: WO2022/084961

PCT Pub. Date: Apr. 28, 2022

(65) Prior Publication Data

US 2023/0379777 A1 Nov. 23, 2023

Related U.S. Application Data

(60) Provisional application No. 63/104,341, filed on Oct. 22, 2020.

(51) Int. Cl.
*H04W 36/00* (2009.01)

(52) U.S. Cl.
CPC ... *H04W 36/0085* (2018.08); *H04W 36/0061* (2013.01)

(58) Field of Classification Search
CPC .................................................... H04W 36/00
See application file for complete search history.

(56) References Cited

U.S. PATENT DOCUMENTS

2016/0112149 A1* 4/2016 Kim .................... H04B 17/309 370/252
2016/0227524 A1* 8/2016 Choi ......................... H04L 5/00
2021/0337469 A1* 10/2021 Zhou ................ H04W 52/0229

FOREIGN PATENT DOCUMENTS

WO 2020/063808 A1 4/2020
WO 2022/074602 A1 4/2022

OTHER PUBLICATIONS

International Search Report and Written Opinion dated Feb. 3, 2022 issued in PCT Application No. PCT/IB2021/059787, filed Oct. 22, 2021, consisting of 19 pages.

(Continued)

*Primary Examiner* — Michael T Vu
(74) *Attorney, Agent, or Firm* — Weisberg I.P. Law, P.A.

(57) ABSTRACT

A method, network node and wireless device (WD) are disclosed for mobility-enhanced reporting of serving cells. According to one aspect, a method in a wireless device, WD, configured with a plurality of PCIs for a mobility procedure is provided where the WD is configured to communicate with a network node with one or more cells operating in a same serving frequency, and each cell associated with one or more PCIs. The method includes receiving a reporting configuration to configure the WD to report at least one cell measurement in a measurement report where the at least one cell measurement is associated with a subset of PCIs of the plurality of PCIs, performing the at least one cell measurement and transmitting the measurement report where the measurement report includes the at least one cell measurement and is configured according to the reporting configuration.

15 Claims, 10 Drawing Sheets

(56) References Cited

OTHER PUBLICATIONS

3GPP TSG-RAN WG1 Meeting #102-e; Tdoc R1-2005842; eMeeting, Aug. 17-28, 2020; Agenda Item: 8.1.1; Source: Ericsson; Title: Enhancements to Multi-Beam Operation; Document for: Discussion, consisting of 16 pages.
3GPP TSG-RAN WG1 Meeting #103-e; Tdoc R1-2009070; eMeeting, Oct. 26-Nov. 13, 2020; Agenda Item: 8.1.2.2; Source: Ericsson; Title: Enhancement on Multi-TRP Inter-Cell Operation; Document for: Discussion, Decision, consisting of 3 pages.
3GPP TSG RAN WG1 #102-e; R1-2006248; eMeeting, Aug. 17-28, 2020; Agenda Item: 8.1.1; Source: Spreadtrum Communications; Title: Enhancements on Multi-Beam Operation; Document for: Discussion and Decision, consisting of 5 pages.
3GPP TSG-RAN WG2 Meeting #115-e; R2-2107414; Electronic, Aug. 16-27, 2021; Source: VIVO; Agenda Item: 8.17.2; Title: Discussion on Inter-Cell Beam Management; Document for: Discussion and Decision, consisting of 3 pages.
3GPP TSG RAN Meeting #86; RP-193133; Sitges, Spain, Dec. 9-12, 2019; Source: Samsung; Agenda Item: 9.1.1; Title: New WID: Further Enhancements on MIMO for NR; Document for: Approval, consisting of 5 pages.
3GPP TS 38.321 V15.9.0 (Jul. 2020) 3rd Generation Partnership Project; Technical Specification Group Radio Access Network; NR; Medium Access Control (MAC) protocol specification (Release 15), consisting of 78 pages.
3GPP TS 38.331 V15.10.0 (Jul. 2020) 3rd Generation Partnership Project; Technical Specification Group Radio Access Network; NR; Radio Resource Control (RRC) protocol specification (Release 15), consisting of 539 pages.
ETSI TS 138 215 V15.7.0 (Jul. 2020) Technical Specification; 5G; NR; Physical layer measurements (3GPP TS 38.215 version 15.7.0 Release 15), consisting of 18 pages.
3GPP TS 38.214 V16.2.0 (Jun. 2020) 3rd Generation Partnership Project; Technical Specification Group Radio Access Network; NR; Physical layer procedures for data (Release 16), consisting of 163 pages.
European Communication pursuant to Article 94(3) EPC dated Dec. 8, 2025 for Application No. 21801230.0; consisting of 7 pages.
3GPP TS 38.331 V16.1.0; 3rd Generation Partnership Project; Technical Specification Group Radio Access Network; NR; Radio Resource Control (RRC) protocol specification (Release 16); Jul. 2020; consisting of 906 pages.

* cited by examiner

MOBILITY-ENHANCED REPORTING OF SERVING CELLS

CROSS-REFERENCE TO RELATED APPLICATIONS

This application is a Submission Under 35 U.S.C. § 371 for U.S. National Stage Patent Application of International Application No.: PCT/IB2021/059787, filed Oct. 22, 2021 entitled "MOBILITY-ENHANCED REPORTING OF SERVING CELLS," which claims priority to U. S. Provisional Application No.: 63/104341, filed Oct. 22, 2020, entitled "L1/L2-CENTRIC MOBILITY-ENHANCED REPORTING OF SERVING CELLS," the entireties of both of which are incorporated herein by reference.

TECHNICAL FIELD

The present disclosure relates to wireless communications, and in particular, to mobility-enhanced reporting of serving cells.

BACKGROUND

Serving cell measurement reporting in 3$^{rd}$ Generation Partnership Project (3GPP) New Radio (NR, also called 5$^{th}$ Generation or 5G) includes serving cell measurements reported by a wireless device (WD) to a network node. The WD includes the serving cell measurements in every measurement report that is sent to the radio resource control (RRC). The list of serving cell measurements per cell group include: PCell (Master cell group, MCG) and/or PSCell (Secondary cell group, SCG) related measurements; SCell related measurements. These measurements are included as part of the measResultServingMOList of MeasResults Information Element (IE) as captured in 3GPP Technical Specification (TS) 38.331, section 5.5.5.1, for example.

SUMMARY

Some embodiments advantageously provide methods, network nodes and wireless devices for mobility-enhanced reporting of serving cells. According to one aspect, a method is provided in a network node configured to communicate with a wireless device WD configured with a plurality of Physical Cell Identities (PCIs) for a mobility procedure, the WD being configured with one or more cells operating in a same serving frequency, each cell associated with one or more PCIs. The method includes: determining a subset of PCIs among the plurality of PCIs. The method also includes transmitting a reporting configuration to the WD, the reporting configuration comprising an indication to report cell measurements, the cell measurements being associated with the subset of PCIs. The method also includes receiving a measurement report based at least on the reporting configuration.

According to another aspect, a network node includes processing circuitry and network interfaces configured to perform this method.

According to another aspect, a method in a WD configured with a plurality of Physical Cell Identities (PCIs) for a mobility procedure is provided, where the WD is configured with one or more cells operating in a same serving frequency, each cell associated with one or more PCIs. The method includes receiving a reporting configuration to configure the WD to report at least one cell measurement in a measurement report, the at least one cell measurement being associated with a subset of PCIs of the plurality of PCIs. The method also includes performing the at least one cell measurement. The method further includes transmitting a measurement report to the network node, the measurement report including the at least one cell measurement and being configured according to the reporting configuration.

According to another aspect, a wireless device includes processing circuitry and network interfaces configured to perform this method.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
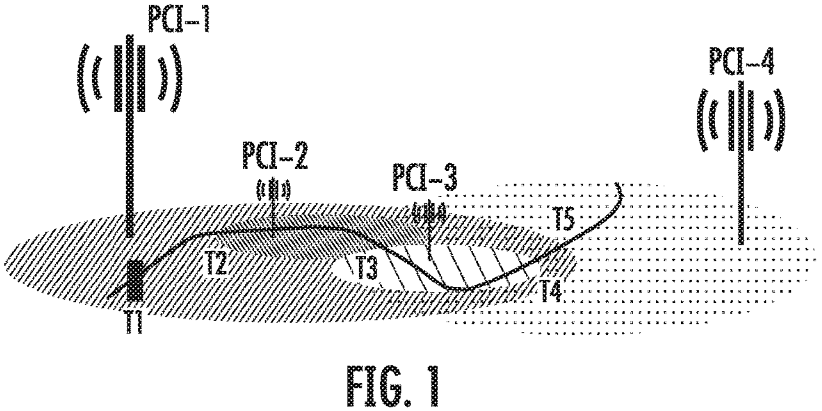
FIGS. 1-3 illustrate examples of a schematic diagram of a network.

Before describing in detail example embodiments, it is noted that the embodiments reside primarily in combinations of apparatus components and processing steps related to mobility-enhanced reporting of serving cells. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" can be any kind of network node comprised in a radio network which may further comprise any of base station (BS), radio base station, base transceiver station (BTS), base station controller (BSC), radio network controller (RNC), gNB, evolved Node B (eNB), Node B, multi-standard radio (MSR) radio node such as MSR BS, multi-cell/multicast coordination entity (MCE), integrated access and backhaul (IAB) node, relay node, donor node controlling relay, radio access point (AP), transmission points/nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" may be used to also denote a WD or a radio network node.

In some embodiments, the non-limiting terms WD or a user equipment (UE) are used interchangeably. The WD can be any type of wireless device capable of communicating with a network node or another WD over radio signals. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, the generic term "radio network node" is used. It can be any kind of a radio network node which may comprise any of base station, radio base station, base transceiver station, base station controller, network controller, RNC, eNB, Node B, gNB, MCE, IAB node, relay node, access point, radio access point, RRU or RRH.

In some embodiments, where the term "PCI" is used, the embodiments may also be performed the same/similarly for serving cells (e.g., intra-frequency) enabled for L1/L2 centric mobility. Thus, the description for such embodiments may replace "PCI" with a serving cell identity.

The term "signaling" used herein may comprise any of: high-layer signaling (e.g., via RRC or a like), lower-layer signaling (e.g., via a physical control channel or a broadcast channel), or a combination thereof. The signaling may be implicit or explicit.

The term "radio measurement" used herein may refer to any measurement performed on radio signals. Radio measurements can be e.g. intra-frequency, inter-frequency, inter-RAT measurements, CA measurements, etc. Some examples of radio measurements: power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc.

Configuring a Radio Node (or a terminal, UE or WD) may refer to the radio node being adapted or caused or set and/or instructed to operate according to the configuration. Configuring may be done by another device, e.g., a network node or network, in which case it may comprise transmitting configuration data to the radio node to be configured. Such configuration data may represent the configuration to be configured and/or comprise one or more instruction pertaining to a configuration, e.g. a configuration for performing certain measurements on certain subframes or radio resources. A radio node may configure itself, e.g., based on configuration data received from a network or network node. A network node may use, and/or be adapted to use, its circuitry for configuring. Allocation information may be considered a form of configuration data. Configuration data may comprise and/or be represented by configuration information, and/or one or more corresponding indications and/or message/s.

A cell may be generally a communication cell, e.g., of a cellular communication network, provided by a node. A serving cell may be a cell on or via which a network node (the node providing or associated to the cell, e.g., gNB) transmits and/or may transmit data to a UE; a serving cell may be a cell for or on which the UE is configured and/or to which it is synchronized and/or has performed an access procedure, e.g., a random access procedure, and/or in relation to which it is in a RRC_connected or RRC_idle state, for example.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

In some embodiments, a "set" as used herein may be a set of 1 or more elements in the set. Examples in this disclosure can apply to different wireless systems, such as 3GPP LTE and/NR, Wide Band Code Division Multiple Access (WCDMA), Worldwide Interoperability for Microwave Access (WiMax), Ultra Mobile Broadband (UMB) and Global System for Mobile Communications (GSM).

Note further that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In 3GPP Release 17 (Rel-17), the 3GPP is going to standardize what is currently referred to as L1/L2 centric inter-cell mobility (or L1-mobility, inter-PCI transmission configuration identity (TCI) state change/update/modification, etc.). This is justified in the Work Item Description RP-193133 (Further enhancements on multiple-input multiple-output (MIMO) for NR), by the fact that, while 3GPP Rel-16 manages to offer some reduction in overhead and/or latency, high-speed vehicular scenarios (e.g., a WD traveling at high speed on highways) in frequency range 2 (FR2) require more aggressive reduction in latency and overhead—not only for intra-cell, but also for L1/L2 centric inter-cell mobility. Generally, mobility procedures that avoid layer 3 signaling according to the procedures set forth herein encompass, but are not limited to, L1/L2 centric mobility.

An understanding for L1/L2 inter-cell mobility is that the WD receives L1/L2 signaling (instead of RRC signaling) indicating a transmission configuration indicator (TCI) state (e.g., for physical downlink control channel (PDCCH)) possibly associated to a synchronization signal block (SSB) whose PCI is not necessarily the same as the PCI of the cell the WD has connected to, e.g., via connection resume or connection establishment, as shown in FIG. 1. The L1/L2-centric inter-cell mobility procedure can be interpreted as a beam management operation expanding the coverage of multiple SSBs associated to multiple PCIs (e.g. associated to the same cell or different cells).

Figure 2:
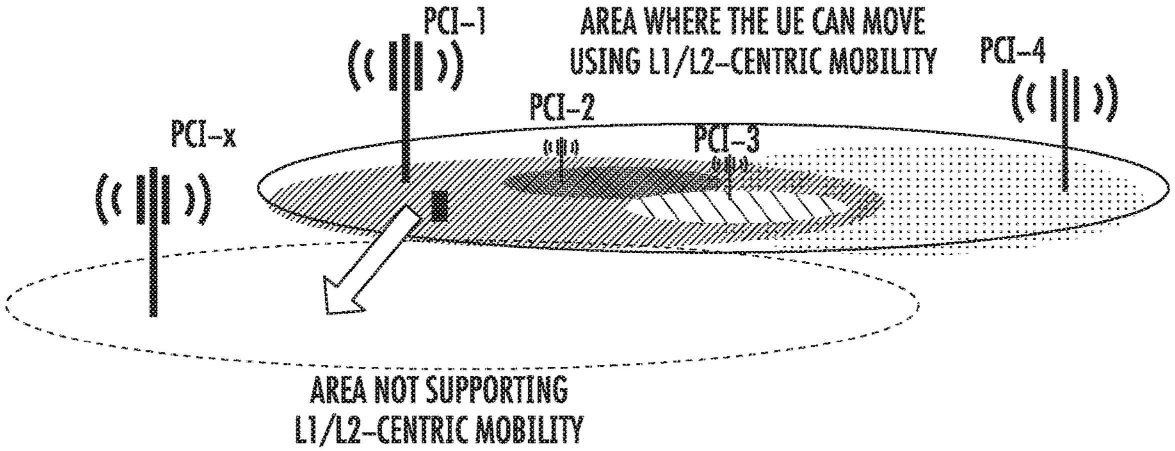
Figure 3:
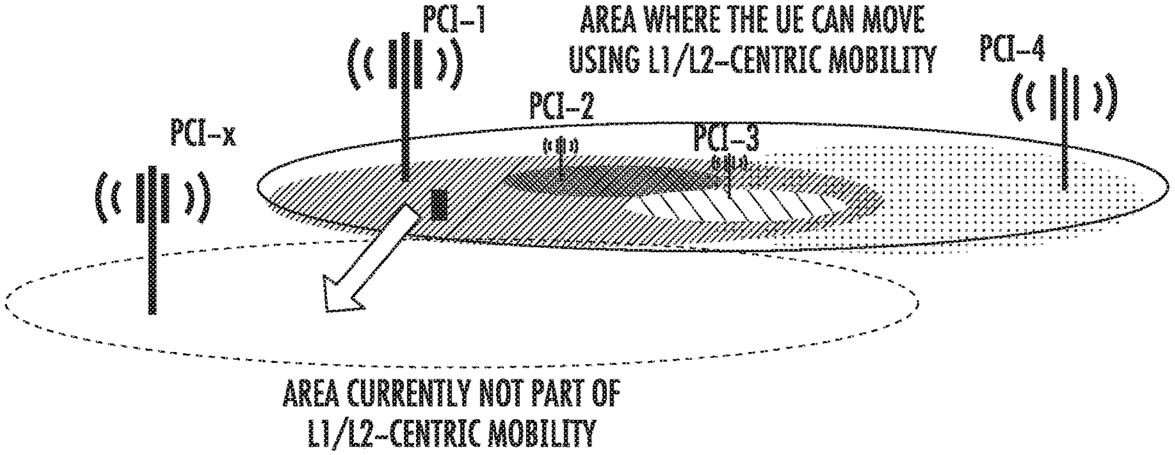

If the feature is available for a capable WD within an area covered by a set of PCIs, the WD can rely on beam management procedures i.e., L1 measurements/reporting and medium access control channel (MAC) control element (CE)/downlink control information (DCI) indications (or any other lower layer signaling as in radio link control (RLC), MAC or PHY layers in the protocol sack). However, the WD might leave the area covered by the PCIs and move to an area (e.g., a cell) possibly not supporting L1/L2 inter-cell centric mobility or an area which is currently not configured with the possibility of L1/L2 based inter-cell centric mobility, as shown in FIGS. 2 and 3.

The L1/L2 centric inter-cell mobility configuration provided to a given WD in RRC_CONNECTED might not encompass all the possible PCIs which support the L1/L2 centric inter-cell mobility from the network perspective. Thus, when the WD transitions to connected mode, the network may configure only a subset of PCIs amongst which L1/L2 centric inter-cell mobility could be enabled. This may happen due to, e.g., WD limited capabilities (e.g., number of supported PCIs for the feature configured at one time, number of measurements the WD needs to perform on L1 and/or L3 due to the additional PCIs, or due to a network algorithm strategy for mobility). In addition, there will likely be a border where the WD detects cells not supporting L1/L2 centric mobility. In FIG. 1, the WD is initially configured with PCI-1, PCI-2, PCI-3 and PCI-4 as PCIs amongst which the L1/L2 centric inter-cell mobility could be enabled by the network node. However, PCI-x is not configured to be part of this set. So, when the WD approaches the border between the region in which the L1/L2 centric inter-cell mobility is enabled and PCI-x, then the WD generates a measurement report. However, it is not clear as to which PCI related measurements are included by the WD to enable the better configuration of new candidates for L1/L2 centric inter-cell mobility and enabling the network node to make an educated decision of whether reconfiguration with synchronization or handover should be triggered.

Figure 4:
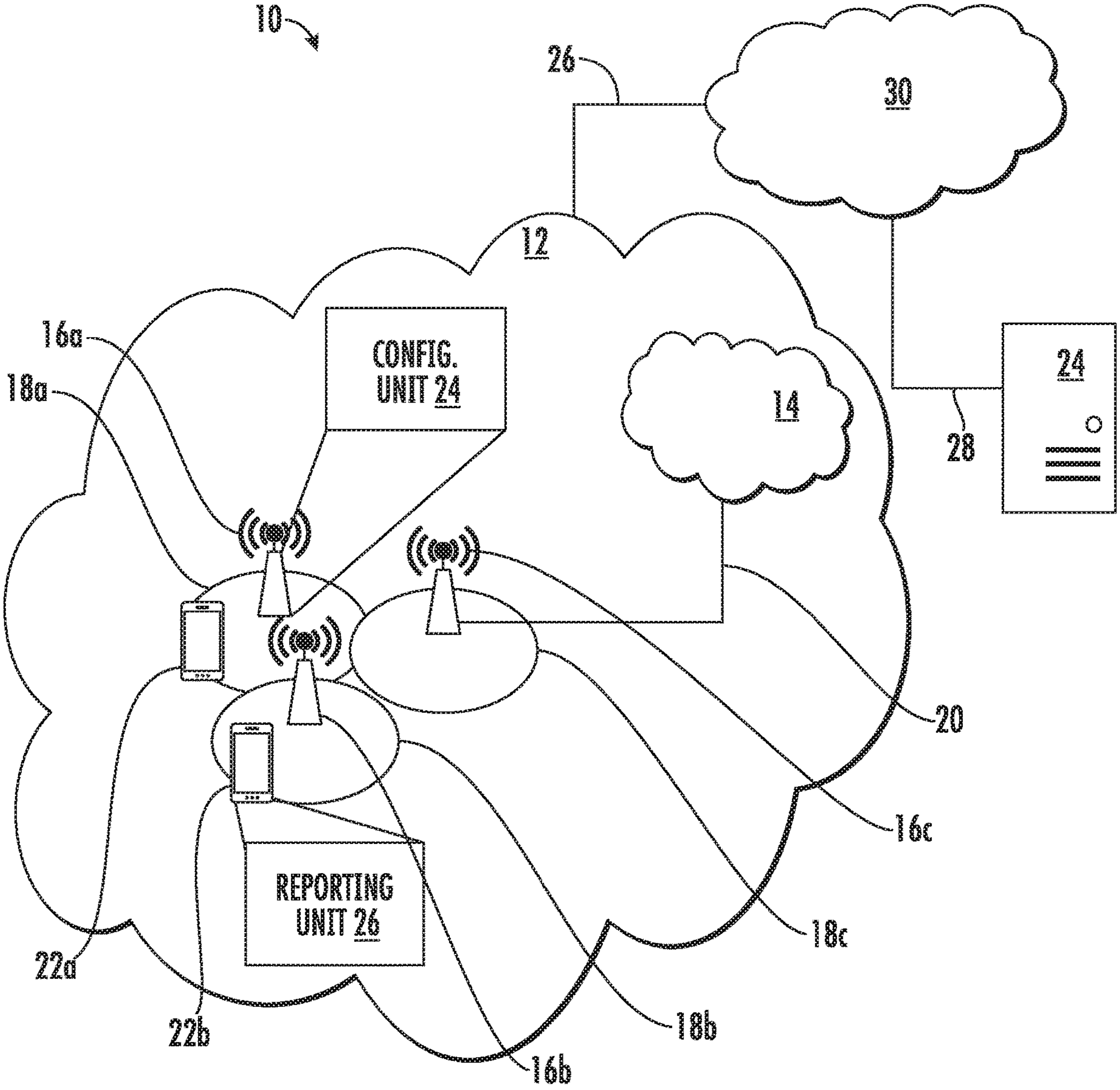
FIG. 4 is a schematic diagram of an example network architecture illustrating a communication system according to principles disclosed herein.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR, which comprises an access network 12, such as a radio access network, and a core network 14. The access network 12 comprises a plurality of network nodes 16*a*, 16*b*, 16*c* (referred to collectively as network nodes 16), such as eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first WD 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a configuration unit 24 which is configured to configure the WD to transmit a measurement report reporting at least a subset of the performed plurality of cell measurements. In some embodiments, the configuration unit 24 may be configured to cause the network node 16 to cause transmission of a reporting configuration to the WD 22, the reporting configuration comprising an indication to report cell measurements based on the subset of PCIs.

A WD 22 is configured to include a reporting unit 26 which is configured to configure a measurement report according to the received reporting configuration to include the subset of the plurality of cell measurements. In some embodiments, the reporting unit 26 is configured to cause the wireless device 22 to transmit a measurement report to the network node 16 where the measurement report includes the at least one cell measurement and is configured according to a reporting configuration.

Example implementations of the WD 22 and network node 16 will now be described with reference to FIG. 5. The communication system 10 includes a network node 16 provided in a communication system 10 and including hardware 28 enabling it to communicate with the WD 22. The hardware 28 may include a radio interface 30 (also referred to as network interface 30) for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from)

the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16.

The communication system 10 further includes the WD 22 already referred to. The WD 22 may have hardware 44 that may include a radio interface 46 (also referred to as network interface 46) configured to set up and maintain a wireless connection 32 with a network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In addition to or instead of a processor, such as a central processing unit, and memory, the processing circuitry 50 may comprise integrated circuitry for processing and/or control, e.g., one or more processors and/or processor cores and/or FPGAs and/or ASICs adapted to execute instructions. The processor 52 may be configured to access (e.g., write to and/or read from) memory 54, which may comprise any kind of volatile and/or nonvolatile memory, e.g., cache and/or buffer memory and/or RAM and/or ROM and/or optical memory and/or EPROM.

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 can perform the WD's functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

Figure 5:
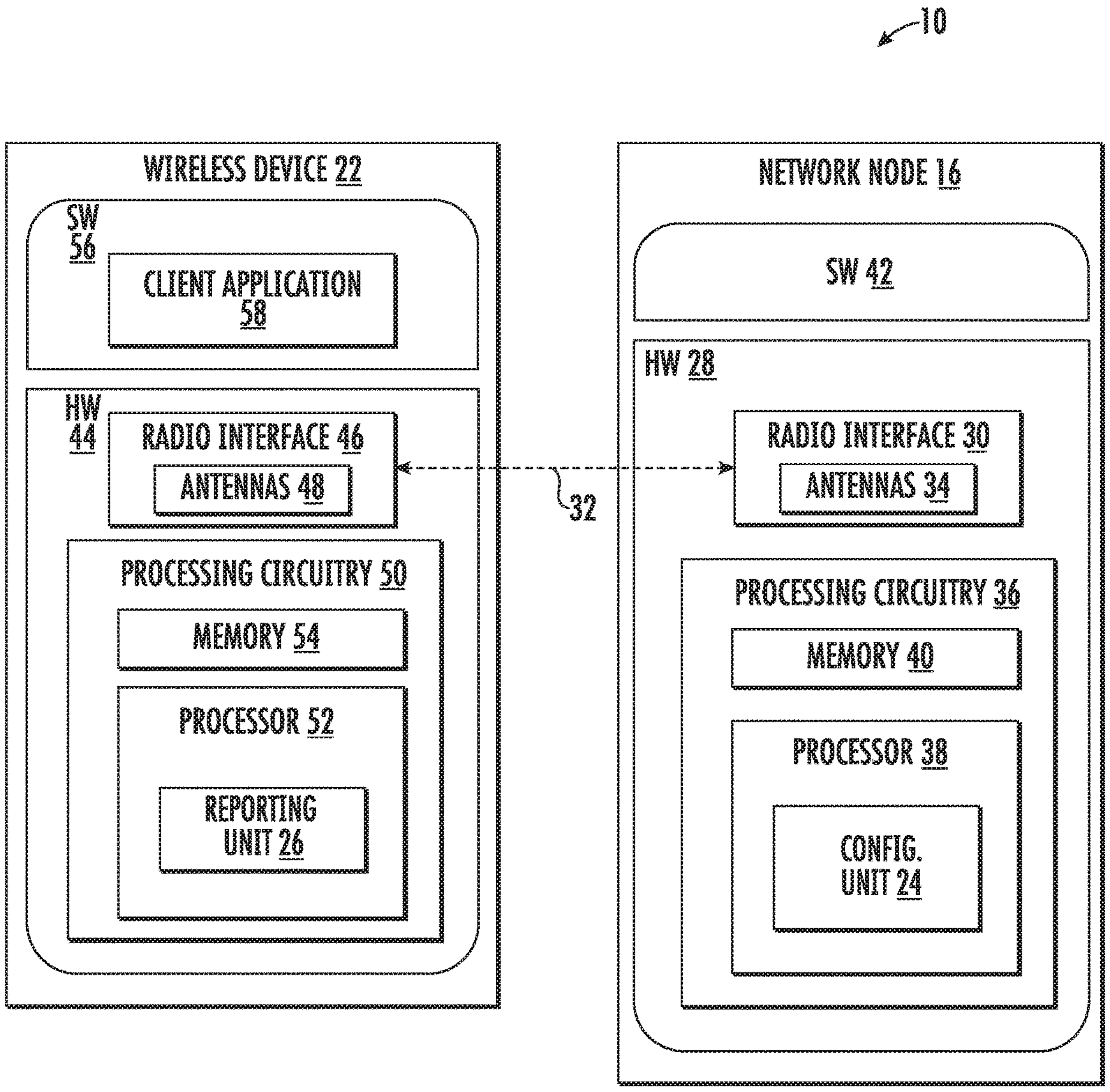
FIG. 5 is a block diagram of a network node in communication with a wireless device over a wireless connection according to some embodiments of the present disclosure.

In some embodiments, the inner workings of the network node 16 and WD 22 may be as shown in FIG. 5 and independently, the surrounding network topology may be that of FIG. 3.

The wireless connection 32 between the WD 22 and the network node 16 is in accordance with the teachings of this disclosure.

Although FIGS. 4 and 5 show various "units" such as configuration unit 24 and reporting unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
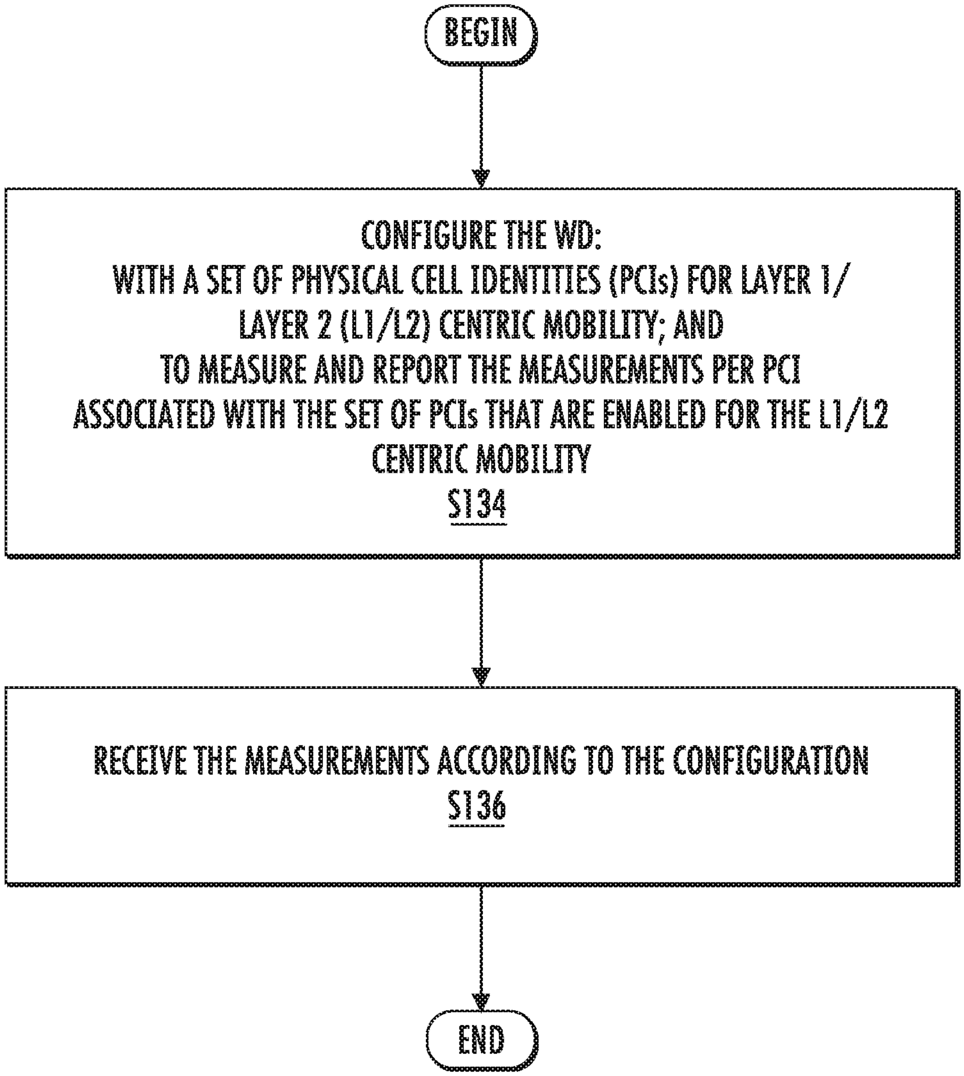
FIG. 6 is a flowchart of an example process in a network node for mobility-enhanced reporting of serving cells according to some embodiments.

FIG. 6 is a flowchart of an example process in a network node 16 according to principles disclosed herein. One or more blocks described herein may be performed by one or more elements of network node 16 such as by one or more of processing circuitry 36, processor 38, and/or radio interface 30. Network node 16 is configured to configure (Block S134) the WD with a set of PCIs for L1/L2 centric mobility; and to measure and report the measurements per PCI associated with the set of PCIs that are enabled for the L1/L2 centric mobility. The method includes receiving (Block S136) the measurements according to the configuration.

In some embodiments, receiving the measurements comprises receiving the measurements per PCI and/or per serving cell enabled for the L1/L2 centric mobility.

Figure 7:
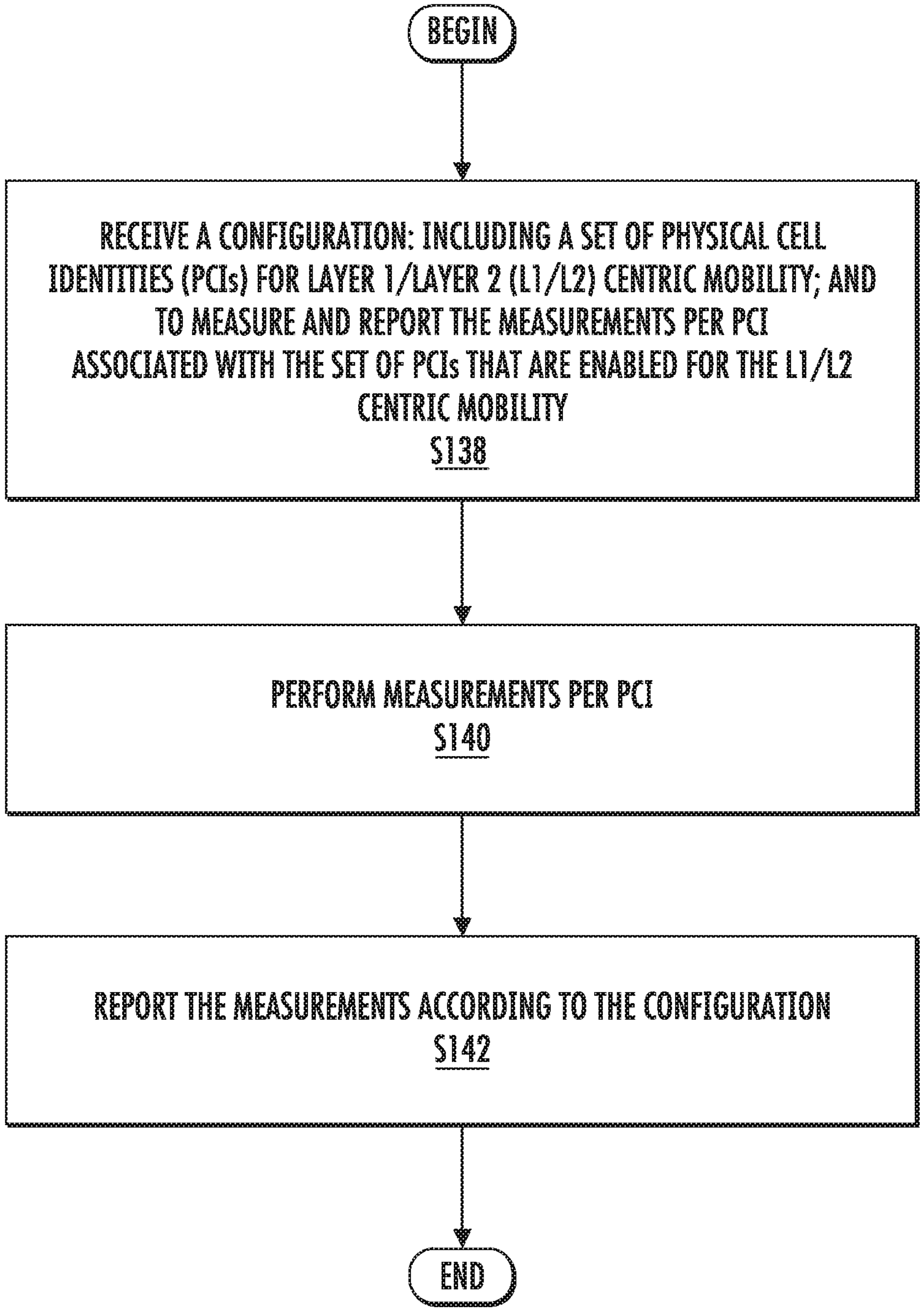
FIG. 7 is a flowchart of an example process in a wireless device for mobility-enhanced reporting of serving cells according to some embodiments.

FIG. 7 is a flowchart of an example process in a WD 22 according to some embodiments. One or more Blocks and/or functions and/or methods performed by WD 22 may be performed by one or more of processing circuitry 50, processor 86, radio interface 46, etc. The example method includes receiving (Block S138) a configuration: including a set of PCIs for L1/L2 centric mobility; and to measure and report the measurements per PCI associated with the set of PCIs that are enabled for the L1/L2 centric mobility. The method includes performing (Block S140) measurements per PCI. The method includes reporting (Block S142) the measurements according to the configuration.

L1/L2 signaling and MAC CEs may be used interchangeably herein. MAC CE is an example of a L1/L2 signaling for L1/L2-centric inter-cell mobility. However, other signaling may be employed. Another example of L1/L2 signaling for L1/L2-centric inter-cell mobility is DCI, which may also indicate a TCI state (that may be mapped to a PCI, hence may also be used for mobility). Terminology of 5G NR in its specifications (e.g., 3GPP TS 38.331, TS 38.321 and TS 38.215) may be employed herein, although embodiments described herein are not restricted to limitations that may be implied by such terminology. For example, some methods described herein may be applicable for any RAT, where the concept of TCI states (or equivalent, like beam-based mobility) is applicable.

Serving cell measurements may include at least RSRP and/or RSRQ and/or SINR performed on reference signals (e.g., SSBs) associated to a serving cell. Cell measurements may include SpCell measurements and PCell measurements when the WD 22 is configured with multiple PCI(s). The measurements can be on a PCI, a cell or a beam associated to a PCI and/or a cell. The measurements may include at least RSRP and/or RSRQ and/or SINR performed on reference signals (e.g., SSBs associated to a serving cell). Cell measurements may include one or more of the following:

NR measurements;

Inter-RAT measurements of E-UTRA frequencies.

Inter-RAT measurements of UTRA-FDD frequencies.

Measurement results per SS/PBCH block;

Measurement results per cell based on SS/PBCH block(s); SS/PBCH block(s) indexes.

Measurement results per CSI-RS resources configured for the WD 22 in CSI-MeasConfig (CSI-RS resources concerning the serving cell regardless of whether related to the original SSB/PCI of one of the additional SSB/PCIs);

Measurement results per neighbor cell based on CSI-RS resources. These are configured for the WD 22 in the radio resource management (RRM) part of the RRC configuration that is in the MeasConfig information element (IE). These CSI-RS resources may be related to the other cluster SSB/PCI; and/or CSI-RS resource measurement identifiers.

Figure 8:
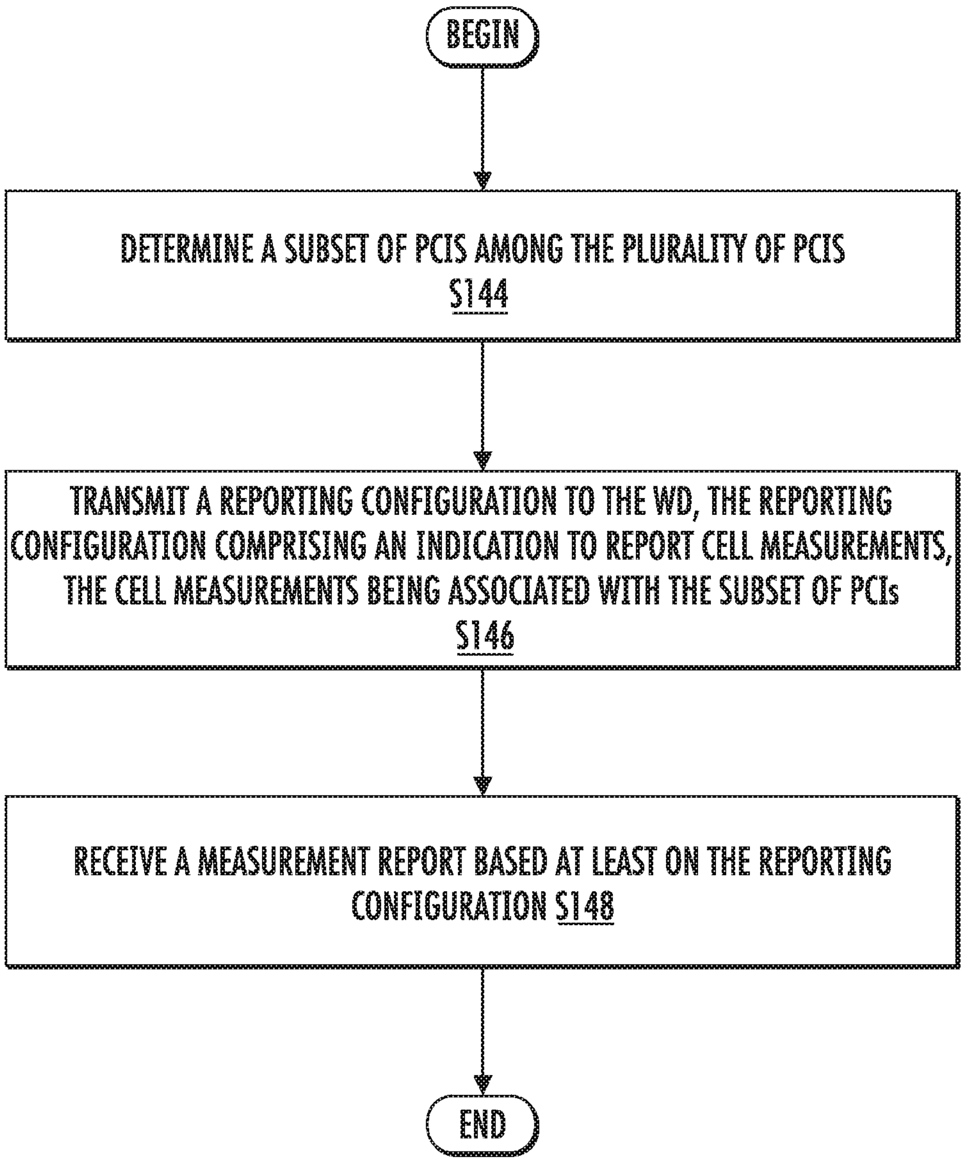
FIG. 8 is a flowchart of another example process in a network node for mobility-enhanced reporting of serving cells according to some embodiments of the present disclosure.

FIG. 8 is a flowchart of an example process in a network node 16 according to some embodiments of the present disclosure. One or more Blocks and/or functions and/or methods performed by the network node 16 may be performed by one or more of processing circuitry 36, processor 38, radio interface 30, etc. The example process includes determining (Block S144) a subset of PCIs among the plurality of PCIs. The example process also includes transmitting (Block S146) a reporting configuration to the WD 22, the reporting configuration comprising an indication to report cell measurements, the cell measurements being associated with the subset of PCIs. The process also includes receiving (Block S148) a measurement report based at least on the reporting configuration.

In some embodiments, the reporting configuration indicates no cell measurement in the measurement report for a current PCI of a serving cell, the current PCI being associated with a transmission configuration indicator, TCI, state currently used to serve the WD 22. In some embodiments, the reporting configuration includes a cell measurement associated with a current PCI serving cell, the current PCI serving cell being associated with a TCI state currently used to serve the WD 22. In some embodiments, the reporting configuration includes an indication to the WD 22 to perform cell measurements for each PCI in the subset of PCIs, the cell measurements being one of a reference signal received power, RSRP, measurement, a reference signal received quality, RSRQ, measurement and a signal to interference plus noise ratio, SINR, measurement. In some embodiments, the reporting configuration indicates a PCI for which the associated cell measurement is a strongest cell measurement of the plurality of cell measurements. In some embodiments, the reporting configuration indicates whether a current PCI serving cell is an initial PCI serving cell associated with a transmission configuration indicator, TCI, configuration received by the WD 22 as part of a dedicated serving cell configuration message. In some embodiments, the reporting configuration indicates whether a PCI associated with a reported cell measurement is a PCI of a current PCI serving cell, the current PCI serving cell being a PCI serving cell associated with a transmission configuration indicator, TCI, state currently used to serve the WD 22. In some embodiments, a number of cell measurements to be included in the measurement report is limited to a maximum number. In some embodiments, the measurement report includes a group of at least one cell measurement having a magnitude that exceeds a threshold. In some embodiments, a different threshold is applied for different types of cell measurements.

According to another aspect, a network node 16 includes processing circuitry 36 and network interfaces 30 configured to perform this method.

Details regarding the different steps and various substeps are described as follows.

As to steps S144 and S146, for L1/L2 inter-cell centric mobility, the WD 22 is configured by the network node 16 with additional PCIs (e.g., PCI-2, PCI-3, PCI-4), wherein each additional PCI, or equivalently stated, any SSB beam related to the additional PCI, can be used as a Quasi-Co-Location (QCL) source in a TCI state with which the WD 22 is configured. In some known methods, the WD 22 assumes that the QCL source of a TCI state is a RS associated with the serving cell's first PCI (i.e., the PCI in ServingCellConfigCommon). In some embodiments, the WD 22 can be configured by the network node 16 with a different PCI(s) (SSB of different PCI) in the TCI state configuration. An example where another PCI is added to the TCI state is shown below:

```
  ASN1START
  TAG-TCI-STATE-START
TCI-State ::=              SEQUENCE {
tci-StateId              TCI-StateId,
qcl-Type1                  QCL-Info,
qcl-Type2                  QCL-Info               OPTIONAL,   -
- Need R
...
}
QCL-Info ::=               SEQUENCE {
cell                  ServCellIndex    OPTIONAL,    -- Need R
phyCellId                                          PhysCellId
OPTIONAL,    -- Need R
bwp-Id                   BWP-Id                 OPTIONAL, --
Cond CSI-RS-Indicated
referenceSignal              CHOICE {
csi-rs                NZP-CSI-RS-ResourceId,
ssb                   SSB-Index
},
qcl-Type                 ENUMERATED {typeA, typeB, typeC, typeD},
...
}
  TAG-TCI-STATE-STOP
  ASN1STOP
```

| QCL-Info field descriptions |
| --- |
| bwp-Id<br>The DL BWP which the RS is located in. |
| cell<br>The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 clause 5.1.5. |
| referenceSignal<br>Reference signal with which quasi-collocation information is provided as specified in TS 38.214 subclause 5.1.5. |
| phyCellId<br>Physical cell identity associated to the reference signal configured as QCL source. |
| qcl-Type<br>QCL type as specified in TS 38.214 subclause 5.1.5. |

One possible solution for this signaling is that the absence of phyCellId indicates to the WD 22 that the PCI to be assumed is the PCI included in ServingCellConfigCommon, for that configured TCI state.

Even though the term "L1/L2 inter-cell centric mobility" has the term "inter-cell," according to one aspect a serving cell configuration has more than one PCI associated to it, and for that there are at least 2 approaches to create that association:

Solution 1) Intra-cell multi-PCI L1/L2 centric mobility, where same serving cell configuration is associated to more than one PCI;

Solution 2) Inter-cell multi-PCI L1/L2 centric mobility, where WD 22 has several serving cell configurations with respective PCIs associated but TCI state may refer to other serving cell PCIs.

Solution 1) Intra-Cell Multi-PCI L1/L2 Centric Mobility

According to some embodiments, for a given serving cell configuration, there can be a different PCI in a TCI state configuration compared to the PCI in ServingCellConfigCommon, e.g., PCI-1, which is an additional PCI e.g., PCI-2. The network node 16 may determine a list of a plurality of PCIs, each PCI in the list corresponding to a different mobility-enabled serving cell and transmit this list, implicitly or explicitly, to the WD, as in step S150. In that case, the WD 22 receiving the MAC CE may determine the PCI associated to the indicated TCI, to determine the SSB (or CSI-RS) associated, and hence, determine the downlink beam. If the WD 22 receives a TCI with PCI indicating PCI-2, for example, the WD 22 may monitor PDCCH in a beam/SSB associated to PCI-2.

Thus, as to step S146, the WD 22 may be configured by the network node 16 to perform a plurality of cell measurements, each cell measurement being associated with a PCI in the list. As to step S148, the network node 16 configures the WD 22 to transmit a measurement report having at least a subset of the cell measurements.

Although the WD 22 is still considered to be in the same serving cell, as there has been no handover, reconfiguration with synchronization or cell reselection, the WD 22 has been indicated a TCI for PDCCH associated with one of the additional PCIs, e.g., PCI-2. Hence, the WD 22 may not even be in the coverage area of PCI-1 indicated in ServingCellConfigCommon. Hence, as serving cell measurements are performed based on a 1-to-1 relation between a serving cell and its associated PCI, it becomes unclear how serving cell measurements for that PCell are performed.

In some cases, the ServingCellConfigCommon before and after the TCI state indication associated to a different PCI than the one in ServingCellConfigCommon (e.g., PCI-2) remains the same, except for the PCI. Hence, the WD 22 is still assumed to be in the same cell after the TCI state indication (e.g., MAC CE) whose TCI state has a different PCI associated to the TCI state. This is not necessarily signaled in the MAC CE, as the TCI state identifier in the MAC CE enables the WD 22 to identify the associated PCI. This case can be referred to as Same cell, change PCI, similar ServingCellConfigCommon.

Solution 2) Inter-Cell Multi-PCI L1/L2 Centric Mobility

In some known methods, the WD 22 assumes that the QCL source of a configured TCI state is a RS associated to the serving cell's single configured PCI (i.e., the PCI in ServingCellConfigCommon). However, in some embodiments, the WD 22 can be configured with a different PCI in the TCI state configuration wherein these PCIs are considered to be associated. That is, WD 22 has different serving cell configurations for these PCIs.

Thus, in some embodiments, the WD 22 is configured by the network node 16 with a list of TCI states, meaning that the WD is configured with a list of additional cells, as the different PCIs are PCIs of different cells (each TCI state has its own PCI, but the same PCI may be used by multiple TCI states). If these are all in the same frequency (like the same absolute radio frequency channel number (ARFCN) for their SSB) these may be considered to be intra-frequency serving cells, where one is considered to be active at a time (unless some form of multi-TRP transmission is enabled).

Whether solution 1 or 2 is applied, the problem still remains: the WD 22 may move between PCI(s) (either associated to the same cell, as in solution 1, or different cells, as in solution 2) and, when moving within that area, the WD 22 should be able to compute its serving cell quality. What is called "changing cell" or "inter-cell" herein does not have the same meaning as changing serving cell as in legacy wireless communication systems.

Reference to mobility herein may refer to when the WD 22 is transmitting or receiving from one so-called source cell and triggers a procedure to start transmitting and receiving from another cell, the so-called target cell. Some embodiments are also applicable for multi-Transmission Reception Point (TRP) transmissions where the WD 22 may be connected simultaneously to multiple cells/PCI(s). In that case, instead of changing from one cell to another, the WD 22 would add/remove (activate/deactivate) a cell using lower layer signaling (i.e., signaling in a protocol layer below RRC like packet data convergence protocol (PDCP), RLC, MAC or PHY signaling). The term L1/L2 inter-cell centric mobility or more simply, mobility, is used herein to refer to these features. Note that the term mobility as used herein includes mobility procedures that include L1/L2 inter-cell centric mobility procedures.

Some embodiments may have in common the fact that they comprise the WD 22 receiving a set of configurations from the network node 16 (e.g., PDCCH and PDSCH configurations and associated TCI states) to enable mobility using faster and more efficient lower layer signaling, for example, when the WD 22 changes from a TCI state associated to one PCI (e.g., of a cell) to a TCI state associated to another PCI (e.g., possibly from another cell).

In some embodiments, the additional SSB/PCI is included in the TCI state configuration in the WD's 22 serving cell configuration. However, the additional SSB/PCI may also be configured elsewhere in the serving cell configuration, for example, even in the measurement object related to the serving cell and only referred to in the TCI states. Thus, the additional SSB/PCI in the TCI state should be considered only as an example. In Solution 1, the WD 22 may be in the serving cell configuration.

The term "L1/L2 inter-cell centric mobility" "L1/L2 mobility", "L1-mobility" or "L1/L2-centric mobility" can be used interchangeably. Conversely, the term "mobility-enabled" encompasses systems with L1/L2 inter-cell centric mobility, but is not limited to such systems. In some embodiments, a WD 22 in RRC_CONNECTED is connected (i.e., being served by) to a serving cell, considered to be the PCell, e.g., after the WD 22 performs connection setup, if transitioning from RRC_IDLE to RRC_CONNECTED, or connection resume, transitioning from RRC_INACTIVE to RRC_CONNECTED. The WD 22 has a first PCI associated to that PCell, i.e., the PCI in ServingCellConfigCommon/SIB1 for the cell the WD 22 was camping on when it performed the random access for the transition to RRC_CONNECTED (e.g., denoted PCI-1). In the multi-beam scenario, a cell can be associated with multiple SSBs, and during a half-frame, different SSBs may be transmitted in different spatial directions.

One example of the first PCI associated to that PCell is shown below, e.g., the field phyCellId of IE PhysCellId in ServingCellConfigCommon (e.g., transmitted in SIB1 and acquired by the WD 22 before the WD 22 performs the random access):

```
ServingCellConfigCommon ::= SEQUENCE {
   physCellId          PhysCellId
HOAndServCellAdd,
   downlinkConfigCommon
HOAndServCellAdd
   UplinkConfigCommon
   supplementaryUplinkConfig      UplinkConfigCommon
   n-TimingAdvanceOffset    ENUMERATED
   ....
}
```

In some embodiments, the per-PCI level measurements associated with the PCIs within which the L1/L2 centric mobility is enabled is applicable for each of the serving frequencies, whereas in some other embodiments, the per-PCI level measurements associated to the PCIs within which the L1/L2 centric mobility is enabled is applicable only for the serving frequency that triggered the measurement report.

Some embodiments include methods for a WD 22 for performing measurement reporting associated to individual PCI specific measurements associated with the PCIs for which L1/L2 centric mobility is enabled.

Figure 9:
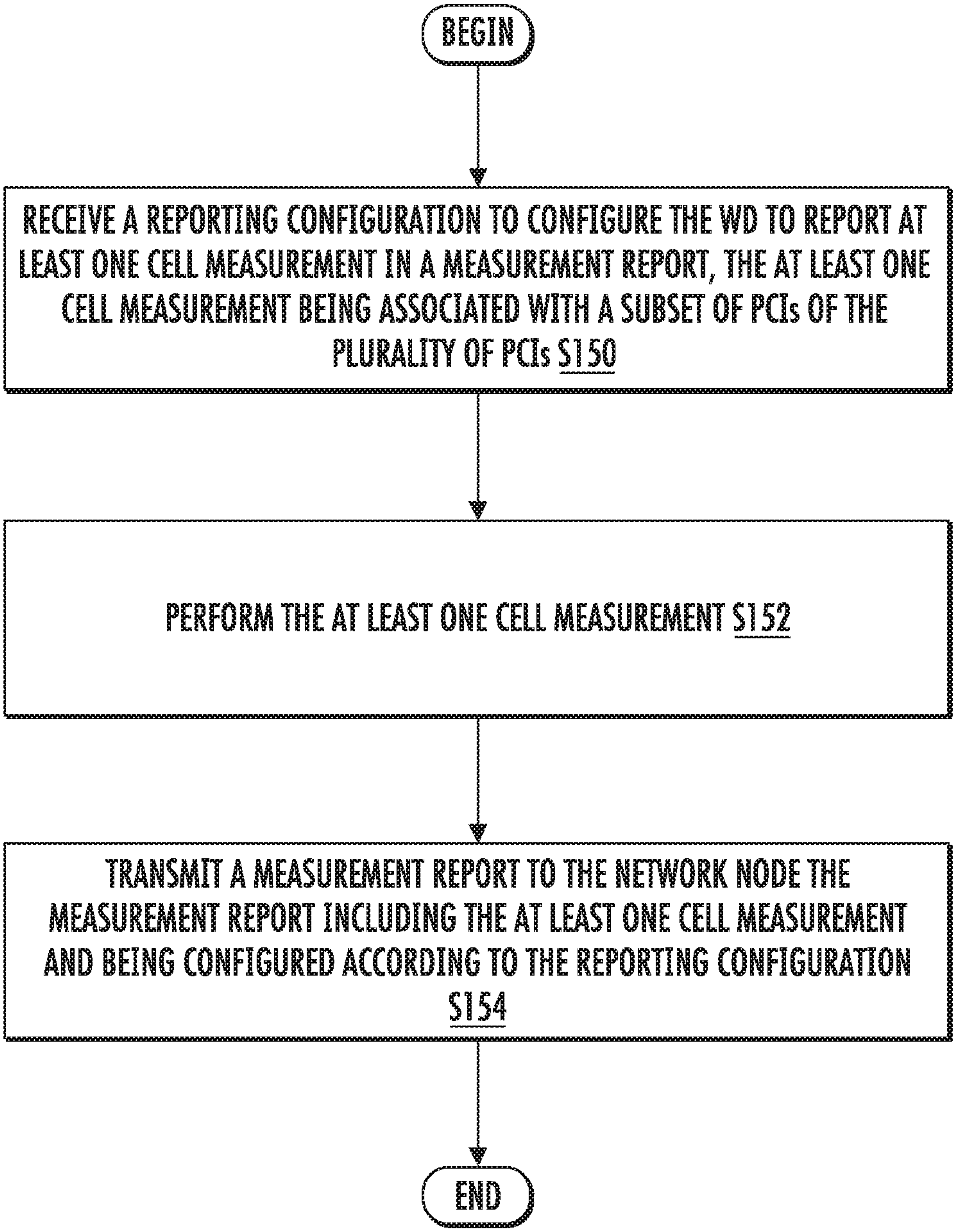
FIG. 9 is a flowchart of another example process in a wireless device for mobility-enhanced reporting of serving cells according to some embodiments of the present disclosure.

FIG. 9 is a flowchart of an example process in a wireless device 22 according to some embodiments. One or more Blocks and/or functions and/or methods performed by WD 22 may be performed by one or more of processing circuitry 50, processor 86, radio interface 46, etc. The example process includes receiving (Block S150) a reporting configuration to configure the WD 22 to report at least one cell measurement in a measurement report, the at least one cell measurement being associated with a subset of PCIs of the plurality of PCIs. The process also includes performing (Block S152) the at least one cell measurement. The process further includes transmitting (Block S154) a measurement report to the network node 16 the measurement report including the at least one cell measurement and being configured according to the reporting configuration.

In some embodiments, the method further includes determining whether to trigger an event for measurement reporting, based at least in part on the at least one cell measurement. In some embodiments, the subset of PCIs includes a single PCI. In some embodiments, the reporting configuration indicates the subset of PCIs. In some embodiments, the method includes performing a cell measurement for the single PCI and including the cell measurement associated with the single PCI.

In some embodiments, the method also includes performing the at least one cell measurement for one or more PCIs in the subset of PCIs and including each cell measurement for each PCI in the measurement report. In some embodiments, the reporting configuration includes configuring the measurement report to include no cell measurement for a current PCI of a cell, the current PCI being associated with a transmission configuration indicator, TCI, state currently used to serve the WD 22. In some embodiments, the reporting configuration includes configuring the measurement report to report a cell measurement associated with a current PCI of a cell, the current PCI being associated with a transmission configuration indicator, TCI, state currently used to serve the WD 22. In some embodiments, performing the at least one cell measurement comprises performing one of a reference signal received power, RSRP, measurement, a reference signal received quality, RSRQ, measurement and a signal to interference plus noise ratio, SINR, measurement. In some embodiments, the measurement report indicates a PCI for which the associated cell measurement is a strongest cell measurement of the plurality of cell measurements. In some embodiments, the measurement report indicates whether a current PCI serving cell is an initial PCI serving cell associated with a transmission configuration indicator, TCI, configuration received by the WD 22 as part of a dedicated serving cell configuration message. In some embodiments, the measurement report to indicates whether a PCI associated with a reported cell measurement is a PCI of a current PCI of a serving cell, the current PCI being a PCI associated with a transmission configuration indicator, TCI, state currently used to serve the WD 22. In some embodiments, a number of cell measurements to be included in the measurement report is limited to a maximum number. In some embodiments, the measurement report includes a group of at least one cell measurement having a magnitude that exceeds a threshold. In some embodiments, a different threshold is applied for different types of cell measurements.

According to another aspect, a wireless device 22 includes processing circuitry 50 and network interfaces 46 configured to perform this method.

Details regarding the different steps and various substeps are described as follows.

In some embodiments, the measurement quantities included as part of the per-PCI level measurements associated with the PCIs within which the L1/L2 centric mobility is enabled are L3-filtered measurement quantities, L1-filtered measurement quantities or a combination of the two (e.g., for those PCIs for which L3-filtered measurements are available, L3-filtered measurements are included and those PCIs for which L3-filtered measurements are not available, then the L1 filtered measurements are included in the measurement report). Thus, the WD performs measurements associated with PCIs, as in step S152. These measurements are reported by the WD 22 according to the reporting configuration received by the WD 22 from the network node, as in steps S150, S152 and S154.

In some embodiments, the PCIs that the WD 22 includes as part of the per-PCI level measurements associated with the PCIs within which the L1/L2 centric mobility is enabled, are not considered for the neighbour-cell-related measurement report contents. In some other embodiments, for those PCIs that are part of the per-PCI level measurements associated with the PCIs within which the L1/L2 centric mobility is enabled, related evaluations are not considered for the neighbour cell related measurement report contents.

The WD 22 may include the per-PCI level measurement associated with at least one of the following:

The individual PCI related measurement of the currently serving PCI, i.e., the PCI associated to the TCI state currently being used by the WD 22 at the time of transmitting the measurement report. As the serving cell measurement is based on the initial PCI, the WD's 22 current serving PCI amongst the L1/L2 centric mobility related PCIs could be different. In such a case, the WD 22 includes this currently serving PCI related measurement quantities.

In some embodiments, the network node 16 can configure the WD 22 with an indication as to whether the WD 22 will include the currently serving PCI related measurement in the measurement report (reportServingPCIMeas). This indication could be included in either the measObject configuration or in the reportConfig or in the measCOnfig or in the servingCellConfig.

In some embodiments, the network node 16 may configure which measurement quantities (servingPCIReportQuantity) associated with the serving PCIs associated to the PCIs for which L1/L2 centric mobility is enabled are to be included in the measurement report. If this is not configured, then the WD 22 may be configured to report all the available measurement quantities.

In some embodiments, there could be an indication in the measurement report sent by the WD 22 that indicates whether a particular PCI is the strongest PCI of all the PCIs within which the L1/L2 centric mobility is enabled. In some embodiments, there could be an indication in the measurement report sent by the WD 22 that indicates whether a particular PCI is the current serving PCI, i.e., the PCI associated with the TCI state used currently to serve the WD 22.

An example implementation of a specific combination of the above-mentioned embodiments is given below:

A purpose of one procedure is to transfer measurement results from the WD 22 to the network node 16. The WD 22 may initiate this procedure only after successful AS security activation.

For the measId for which the measurement reporting procedure was triggered, the WD 22 may set the measResults within the MeasurementReport message as follows:

1> set the measId to the measurement identity that triggered the measurement reporting;

. . .

1> if the reportConfig associated with the measId that triggered the measurement reporting includes report QuantityRS-Indexes and maxNrojRS-IndexesToReport:

2> for each serving cell configured with servingCellMO, include beam measurement information according to the associated reportConfig as described in section 5.5.5.2;

1> if the reportConfig associated with the measId that triggered the measurement reporting includes reportServingPCIMeas:

2> for each measObjectId referenced in the measIdList which is also referenced with servingCellMO, other than the measObjectId corresponding with the measId that triggered the measurement reporting:

```
Configuration part:
EventTriggerConfig::=                SEQUENCE {
...
rsType                          NR-RS-Type,
reportInterval                   ,
reportAmount                      ENUMERATED {r1, r2, r4, r8, r16, r32, r64,
infinity},
reportQuantityCell                    MeasReportQuantity,
maxReportCells                        INTEGER (1..maxCellReport),
reportQuantityRS-Indexes                  MeasReportQuantity
OPTIONAL,    -- Need R
maxNrofRS-IndexesToReport                  INTEGER (1..maxNrofIndexesToReport)
OPTIONAL,    -- Need R
includeBeamMeasurements                  BOOLEAN,
reportAddNeighMeas                  ENUMERATED {setup}
OPTIONAL,    -- Need R
...,
   [[
reportServingPCIMeas                     ENUMERATED {setup}
OPTIONAL,    -- Need R
   ]]
}
Reporting part:
MeasResultServMOList ::=             SEQUENCE (SIZE (1..maxNrofServingCells))
OF MeasResultServMO
MeasResultServMO ::=                SEQUENCE {
servCellId                       ServCellIndex,
measResultServingCell                 MeasResultNR,
   measResultCurrentServingPCI                                    MeasResultNR
      OPTIONAL,
measResultBestNeighCell                MeasResultNR
OPTIONAL,
...
}
MeasResultNR ::=                   SEQUENCE {
physCellId                          OPTIONAL,
measResult                          SEQUENCE {
cellResults                      SEQUENCE{
   resultsSSB-Cell                       MeasQuantityResults OPTIONAL,
   resultsCSI-RS-Cell                       MeasQuantityResults OPTIONAL
},
rsIndexResults                      SEQUENCE{
   resultsSSB-Indexes                       ResultsPerSSB-IndexList OPTIONAL,
   resultsCSI-RS-Indexes                       ResultsPerCSI-RS-IndexList OPTIONAL
}  OPTIONAL
},[...]}
```

3> if the measObjectNR indicated by the servingCellMO includes the RS resource configuration corresponding to the rsType indicated in the reportConfig:

4> set the measResultCurrentServingPCI within measResultServingMOList to include the physCellId and the available measurement quantities based on the reportQuantityCell and rsType indicated in reportConfig of the PCI associated to the TCI state currently being used by the WD 22.

Figure 10:
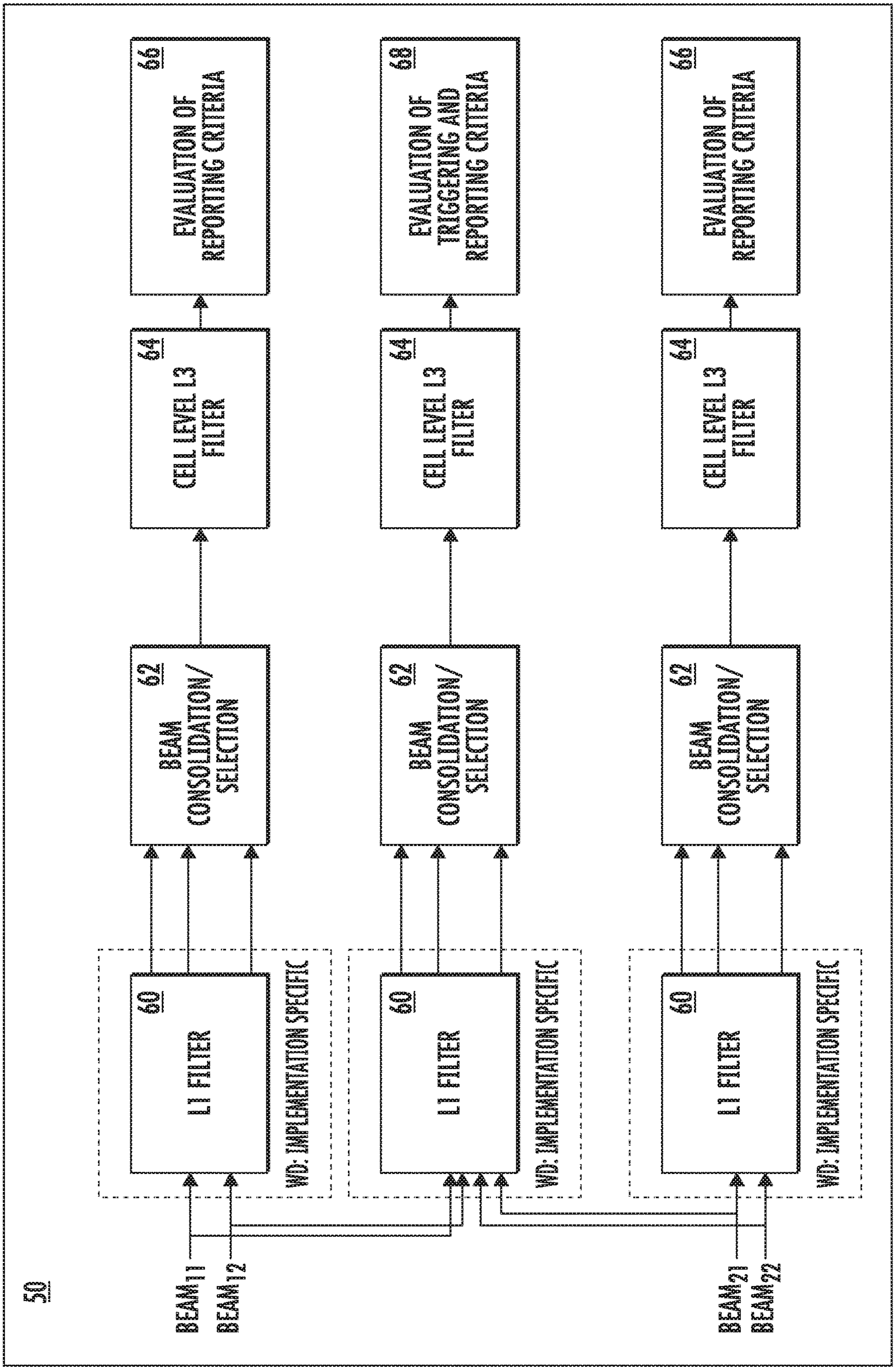
FIG. 10 is a schematic diagram related to the enhanced reporting according to some embodiments of the present disclosure.
Figure 11:
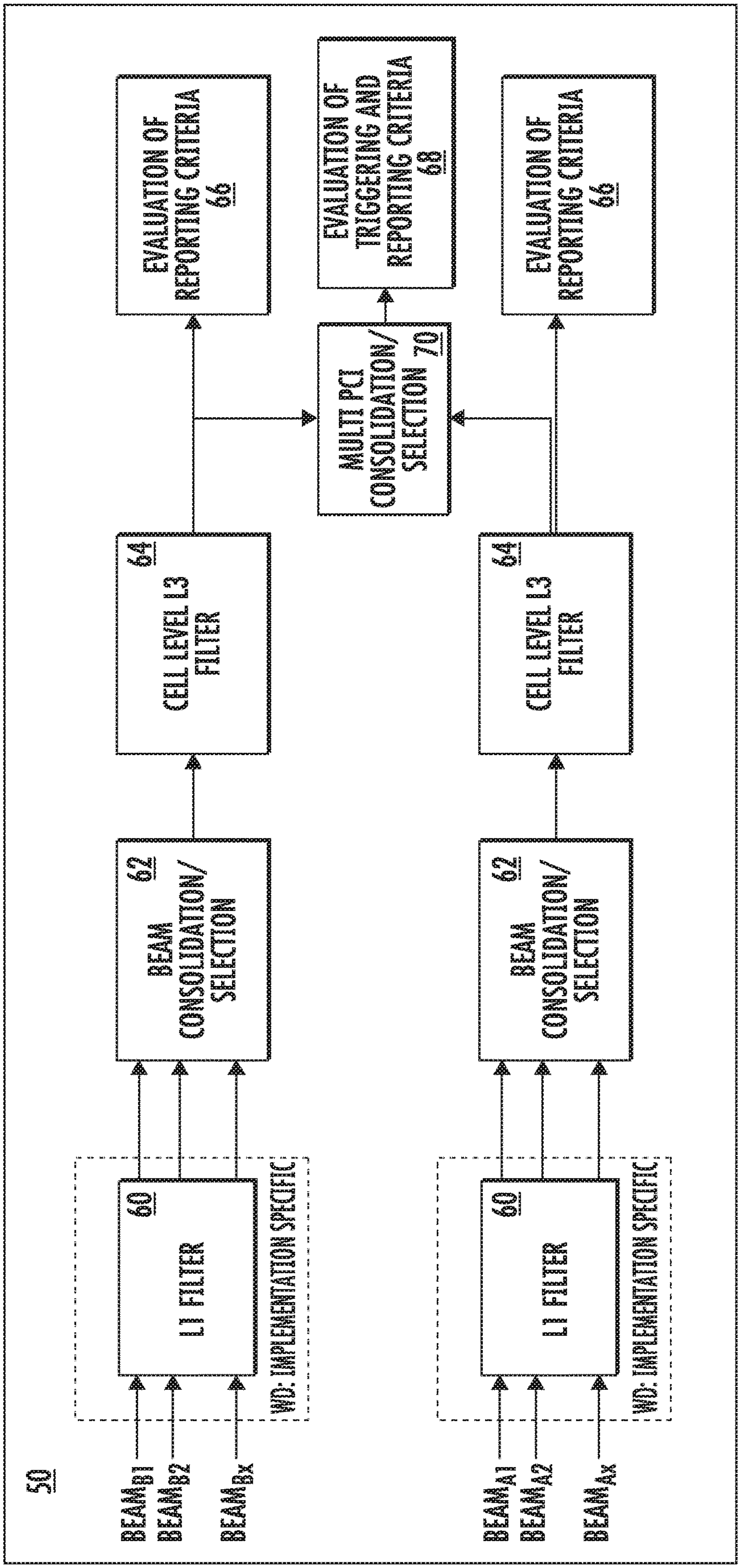
FIG. 11 is a schematic diagram related to the enhanced reporting according to some embodiments of the present disclosure.
Figure 12:
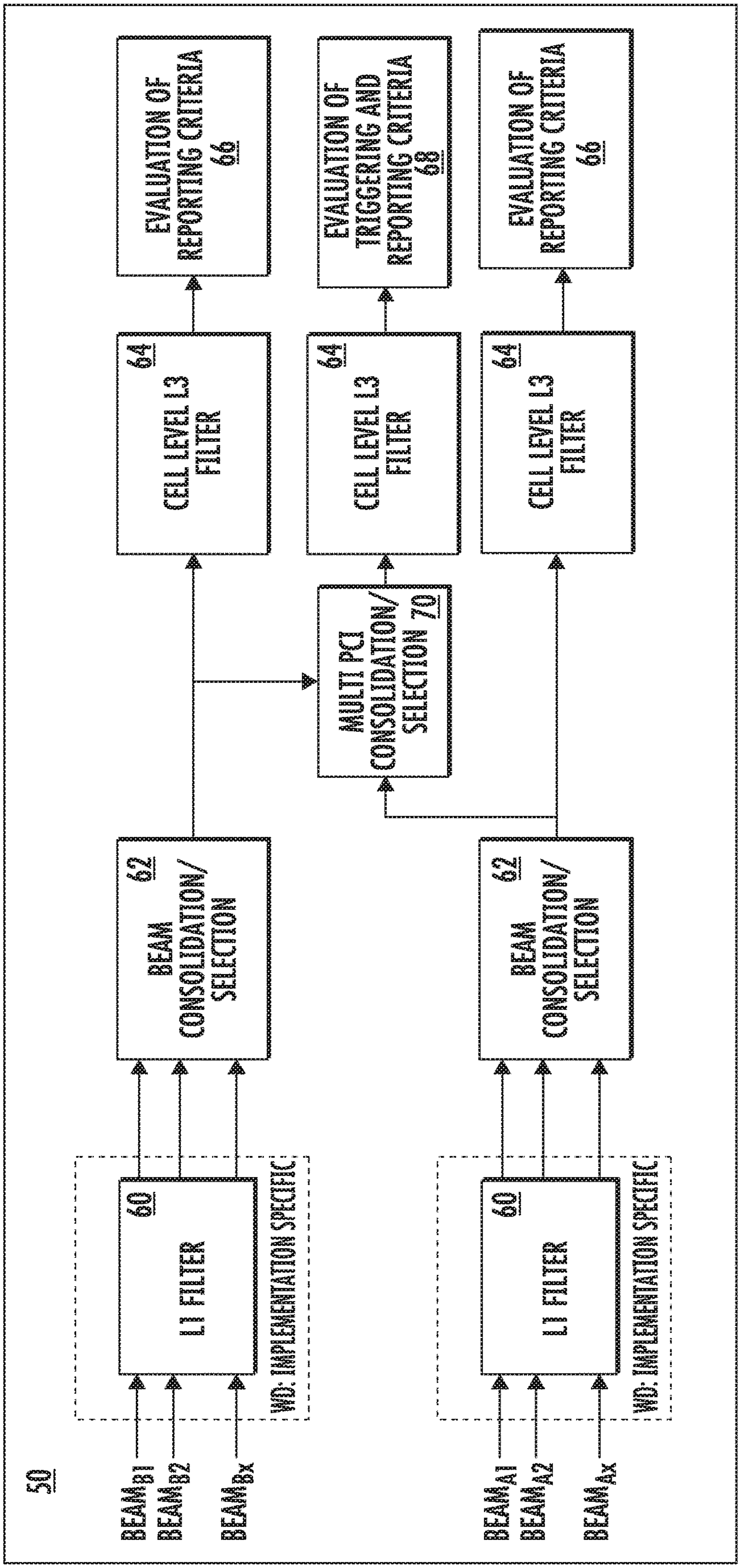
FIG. 12 is a schematic diagram related to the enhanced reporting according to some embodiments of the present disclosure.

FIGS. 10-12 are block diagrams of three different embodiments for mobility-enhanced reporting of serving cells which may be implemented by the processing circuitry 50 and reporting unit 26 of the WD 22. In FIG. 10, beams are received by a plurality of L1 filters 60 in parallel branches. A beam consolidation and selection unit 62 receives the output of an L1 filter 60 and outputs a beam selection which is applied by cell level L3 filter 64. The output of the cell level L3 filter is applied to either a reporting criteria evaluation unit 66 or a triggering and reporting criteria evaluation unit 68.

In FIG. 11, a multi-PCI consolidation and selection unit 70 receives an output from two cell level L3 filters 64. The output of the multi-PCI consolidation and selection unit 70 is applied to the triggering and reporting criteria evaluation unit 68. FIG. 12 differs from FIG. 11 in that the multi-PCI consolidation and selection unit 70 is placed before the cell level L3 filters 64.

The individual PCI related measurements of the PCI (either RSRP or RSRQ or SINR) may be sorted to determine the strongest PCI of all the PCIs within which L1/L2 centric mobility is configured. Further, in some embodiments, RSRP is used as the sorting quantity if RSRP is available, else RSRQ is used as the sorting quantity, if RSRQ is available, else SINR is used as the sorting quantity, at the time of transmitting the measurement report. In some embodiments, the network node 16 can configure the WD 22 with an indication as to whether the WD 22 may include the currently serving PCI related measurement in the measurement report (reportStrongestServingPCIMeas). This indication may be included in either measObject configuration or in reportConfig or in the measCOnfig or in the servingCellConfig. In some embodiments, the network node 16 may configure which measurement quantities (servingPCIReportQuantity) associated to the serving PCIs associated to the PCIs for which L1/L2 centric mobility is enabled are to be included in the measurement report. If this is not configured, then the WD 22 may report all the available measurement quantities. In some embodiments, there could be an indication in the measurement report sent by the WD 22 that indicates whether a particular PCI is the initial PCI in which the WD 22 had received the TCI state configurations as part of the dedicated servingCellConfig. In some embodiments, there could be an indication in the measurement report sent by the WD 22 that indicates whether a particular PCI is the current serving PCI, i.e., the PCI associated to the TCI state used currently to serve the WD 22. An example implementation of a specific combination of the above-mentioned embodiments is given below:

```
Configuration part:
EventTriggerConfig::=                    SEQUENCE {
...
rsType                              NR-RS-Type,
reportInterval                       ,
reportAmount                          ENUMERATED {r1, r2, r4, r8, r16, r32, r64,
infinity},
reportQuantityCell                      MeasReportQuantity,
maxReportCells                          INTEGER (1..maxCellReport),
reportQuantityRS-Indexes                   MeasReportQuantity
OPTIONAL,   -- Need R
maxNrofRS-IndexesToReport                      INTEGER (1..maxNrofIndexesToReport)
OPTIONAL,   -- Need R
includeBeamMeasurements                     BOOLEAN,
reportAddNeighMeas                       ENUMERATED {setup}
OPTIONAL,   -- Need R
...,
  [[
reportStrongestServingPCIMeas                     ENUMERATED {setup}
OPTIONAL,   -- Need R
  ]]
}
Reporting part:
MeasResultServMOList ::=                 SEQUENCE (SIZE (1..maxNrofServingCells))
OF MeasResultServMO
MeasResultServMO ::=                    SEQUENCE {
servCellId                        ServCellIndex,
measResultServingCell                   MeasResultNR,
  measResultStrongestServingPCI
    MeasResultNR                            OPTIONAL,
measResultBestNeighCell                  MeasResultNR
OPTIONAL,
...
}
MeasResultNR ::=                     SEQUENCE {
physCellId                          OPTIONAL,
measResult                          SEQUENCE {
cellResults                       SEQUENCE{
  resultsSSB-Cell                          MeasQuantityResults OPTIONAL,
  resultsCSI-RS-Cell                         MeasQuantityResults OPTIONAL
},
```

-continued

```
rsIndexResults                    SEQUENCE{
  resultsSSB-Indexes                    ResultsPerSSB-IndexList OPTIONAL,
  resultsCSI-RS-Indexes                   ResultsPerCSI-RS-IndexList OPTIONAL
}  OPTIONAL
},[...] }
```

In some embodiments, reporting quantities are set independently for the measurements per PCI on a serving cell, i.e., they are not necessarily to be set to the same values as configured in the field for neighbour cell measurements. See reportQuantityCell for cell quantities to be reported and reportQuantityRS-Indexes for beam quantities to be report, in 3GPP TS 38.331.

Per-Beam Level Measurements Associated to the PCIs within which the L1/L2 Centric Mobility is Enabled The beam measurements in the following embodiments refers to the SSB level measurements and/or CSI-RS level measurements. By enabling the beam level measurements from each of the PCIs, the network node 16 may perform triangulation based positioning (e.g., if these PCIs are non-co-located). The network node 16 may obtain beam specific action. For example , if the WD 22 reports beam-X in cell-Y, then the most likely handover candidate is neighbor cell-Z, whereas if the WD 22 reports beam-Y in cell-Y, then the most likely handover candidate is neighbor cell-A. This may be based on building beam level coverage maps etc.

Another benefit is that the network node 16 may re-configure L1 measurements for beam management operations across multiple PCIs, for the reported PCIs, and/or beam failure recovery. For some embodiments described above, the beam measurements as listed in these set of embodiments are applicable. Those methods are repeated below:

- Beam level measurements related to the currently serving PCI i.e., the PCI associated to the TCI state currently being used by the WD 22 at the time of transmitting the measurement report;
- Beam level measurements related to each of the multiple PCIs for which the WD 22 can move around with L1/L2 signaling.
- Beam level measurements related to multiple PCIs for which the WD 22 can move around with L1/L2 signaling that are above certain threshold. In some embodiments, the threshold is explicitly configured as part of the measurement configuration; and/or
- Beam level measurements related to multiple PCIs amongst which the WD 22 can move around with L1/L2 signaling and those that are explicitly configured to be included in the measurement report.

In some embodiments, the measurement quantities included as part of the per-PCI level beam measurements associated with the PCIs within which the L1/L2 centric mobility is enabled, are L3-filtered beam level measurement quantities or L1-filtered beam level measurement quantities or a combination of the two. For example, for those PCIs for which L3 filtered beam level measurement is available, L3-filtered beam level measurements are included and for those PCIs for which L3-filtered beam level measurement is not available, then the L1-filtered beam level measurements are included.

In some embodiments, the network node 16 may explicitly configure whether the WD 22 may include the beam level measurements associated to the PCIs of the serving cell. This configuration is different from the pre-existing per beam level measurement inclusion as this configuration is specific to the PCIs belonging to the serving cell(s) associated to the L1/L2 centric mobility. An example implementation for such an embodiment is given below.

```
EventTriggerConfig::=                        SEQUENCE {
...
rsType                                  NR-RS-Type,
reportInterval                            ReportInterval,
reportAmount                                ENUMERATED {r1, r2, r4, r8, r16, r32, r64,
infinity},
reportQuantityCell                            MeasReportQuantity,
maxReportCells                                INTEGER (1..maxCellReport),
reportQuantityRS-Indexes                          MeasReportQuantity
OPTIONAL,   -- Need R
maxNrofRS-IndexesToReport                             INTEGER (1..maxNrofIndexesToReport)
OPTIONAL,   -- Need R
includeBeamMeasurements                             BOOLEAN,
reportAddNeighMeas                              ENUMERATED {setup}
OPTIONAL,   -- Need R
...,
[[
includeServingPCIBeamMeasurements                       BOOLEAN
OPTIONAL,   -- Need R
]]
}
```

- Beam level measurements related to the serving PCI, amongst all the PCIs associated to L1/L2 centric mobility, whose measurements are the strongest of all the PCIs.

In some embodiments, the network node 16 may explicitly configure the beam level measurement quantity that the WD 22 may include for the beam level measurements associated to the PCIs of the serving cell. This configuration is different from the pre-existing per beam level measurement quantity configuration as this configuration is specific to the PCIs belonging to the serving cell(s) associated to the L1/L2 centric mobility. In some embodiments, the configuration may be beam indices and in some embodiments, the beam level measurement quantity may be beam level RSRP or beam level RSRQ or beam level SINR or one or more combinations of the beam index, RSRP, RSRQ and SINR. An example implementation for such an embodiment is given below.

```
EventTriggerConfig::=                    SEQUENCE {
...
rsType                                NR-RS-Type,
reportInterval                          ReportInterval,
reportAmount                              ENUMERATED {r1, r2, r4, r8, r16, r32, r64,
infinity},
reportQuantityCell                          MeasReportQuantity,
maxReportCells                              INTEGER (1..maxCellReport),
reportQuantityRS-Indexes                        MeasReportQuantity
OPTIONAL,   -- Need R
maxNrofRS-IndexesToReport                           INTEGER (1..maxNrofIndexesToReport)
OPTIONAL,   -- Need R
includeBeamMeasurements                         BOOLEAN,
reportAddNeighMeas                          ENUMERATED {setup}
OPTIONAL,   -- Need R
...,
[[
reportQuantityRS-IndexesServingPCI                    MeasReportQuantity
OPTIONAL,   -- Need R
]]
}
```

In some embodiments, the maximum number of beams to be included for the PCIs of a serving cell related to L1/L2 centric mobility is limited by an explicit configuration (e.g., the number of beam level measurements to be restricted by maxReportBeamsIntraFreqServCellPCIs). In some embodiments, this maximum number is configured per PCI that is included. In some embodiments, this maximum number is configured across all the PCIs that are part of L1/L2 centric inter-cell mobility. In such embodiments, the WD 22 may include the strongest beam measurements belonging to the PCIs associated to the L1/L2 centric mobility. An example implementation for such an embodiment (wherein the maximum number configured is applicable for all the PCIs associated to L1/L2 centric mobility i.e., not per PCI) is given below.

```
EventTriggerConfig::=                    SEQUENCE {
...
rsType                                NR-RS-Type,
reportInterval                          ReportInterval,
reportAmount                              ENUMERATED {r1, r2, r4, r8, r16, r32, r64,
infinity},
reportQuantityCell                          MeasReportQuantity,
maxReportCells                              INTEGER (1..maxCellReport),
reportQuantityRS-Indexes                        MeasReportQuantity
OPTIONAL,   -- Need R
maxNrofRS-IndexesToReport                           INTEGER (1..maxNrofIndexesToReport)
OPTIONAL,   -- Need R
includeBeamMeasurements                         BOOLEAN,
reportAddNeighMeas                          ENUMERATED {setup}
OPTIONAL,   -- Need R
...,
[[
maxNrofRS-IndexesToReportServingPCI                       INTEGER
(1..maxNrofIndexesToReport)                           OPTIONAL,   -- Need R
]]
}
```

In some embodiments associated to the individual serving PCI related measurements included in the measurement report, the network node 16 may configure the layer-3 filtering parameters explicitly and these filtering parameters can be configured differently from the filtering parameters that are applicable for the neighbouring cell measurements and/or the serving cell related measurements. Such configuration can be applicable separately for cell level and beam level measurements. An example configuration for such filtering configuration is given below. Based on this example, for the individual serving PCI related measurements, the WD 22 may use the filtering parameters as indexed using quantityConfigIndexServingPCI, as shown below.

```
MeasObjectNR ::=                        SEQUENCE {
ssbFrequency                          ARFCN-ValueNR
OPTIONAL,   -- Cond SSBorAssociatedSSB
ssbSubcarrierSpacing                    SubcarrierSpacing
OPTIONAL,   -- Cond SSBorAssociatedSSB
smtc1                         SSB-MTC                 OPTIONAL,
-- Cond SSBorAssociatedSSB
smtc2                         SSB-MTC2                 OPTIONAL,
-- Cond IntraFreqConnected
refFreqCSI-RS                         ARFCN-ValueNR
OPTIONAL,   -- Cond CSI-RS
referenceSignalConfig                   ReferenceSignalConfig,
absThreshSS-BlocksConsolidation           ThresholdNR
OPTIONAL,   -- Need R
absThreshCSI-RS-Consolidation             ThresholdNR
OPTIONAL,   -- Need R
nrofSS-BlocksToAverage                  INTEGER (2..maxNrofSS-BlocksToAverage)
OPTIONAL,   -- Need R
nrofCSI-RS-ResourcesToAverage             INTEGER (2..maxNrofCSI-RS-
ResourcesToAverage)                     OPTIONAL,   -- Need R
quantityConfigIndex                     INTEGER (1..maxNrofQuantityConfig),
offsetMO                             Q-OffsetRangeList,
cellsToRemoveList                       PCI-List
OPTIONAL,   -- Need N
cellsToAddModList                       CellsToAddModList
OPTIONAL,   -- Need N
blackCellsToRemoveList                  PCI-RangeIndexList
OPTIONAL,   -- Need N
blackCellsToAddModList                  SEQUENCE (SIZE (1..maxNrofPCI-Ranges)) OF
PCI-RangeElement     OPTIONAL,   -- Need N
whiteCellsToRemoveList                  PCI-RangeIndexList
OPTIONAL,   -- Need N
whiteCellsToAddModList                  SEQUENCE (SIZE (1..maxNrofPCI-Ranges)) OF
PCI-RangeElement     OPTIONAL,   -- Need N
...,
[[
quantityConfigIndexServingPCI             INTEGER (1..maxNrofQuantityConfig)
OPTIONAL   -- Need M
]]
}
```

A method of cell quality derivation concerns the usage of the initial PCI within the ServingCellConfigCommon obtained when the WD 22 had entered a connected state (or obtained during handover or reconfiguration with synchronization). In such case, even if the WD 22 is configured with a serving cell associated with multiple PCI(s), where each PCI may be associated to a TCI state configuration that may be indicated via L1/L2 signalling (e.g., a MAC CE for TCI state indication for WD-specific PDCCH), the WD 22 performs serving cell measurements based on the initial PCI. These cell measurements are made when the initial PCI is the PCI within ServingCellConfigCommon obtained when the WD 22 had entered a connected state. The PCI the WD 22 considers for performing serving cell measurements (e.g., PCell RSRP, Pcell RSRQ, Pcell SINR, etc.) can be updated so that the WD 22 changes the PCI to be considered for performing, at least one of the following cases:

Upon an MCG reconfiguration with synchronization and/or during a handover (e.g., upon reception of an RRCReconfiguration message including a reconfiguration with sync for a master cell group—MCG); and/or Upon the reception of an explicit indication from the network node 16 (e.g., upon reception of an RRCReconfiguration message including an indication that indicates the WD 22 may change the PCI considered for serving cell measurements).

In some embodiments, the WD 22 may further include the serving cell measurements in the measurement report, i.e., the WD 22 includes the initial PCI related cell quality and the beam level measurements associated to the initial PCI.

In some embodiments, the set of PCIs and the associated beam measurements included in the measurement report as listed above are included in the list of PCIs configured in the TCI state configuration of the WD 22 and/or can be explicitly configured in the serving cell related measurement object.

When applied to any of solutions 1) or 2), the WD 22 may include the per-PCI and associated per-beam level measurements for the PCIs for which the L1/L2 centric inter-cell mobility is enabled in the measurement reports.

In some embodiments, the WD 22 may perform per-PCI level measurements associated to the PCIs within which the L1/L2 centric mobility is enabled. In some embodiments, for each measurement (or set of measurements associated to a PCI) per PCI, the WD 22 includes in the measurement report the associated PCI.

In one example, a signalling structure for the reporting includes measurements per PCI for a given serving cell configured with multiple PCIs. In this example, for a given serving frequency (or serving frequency measurement object), the WD 22 includes measurements per PCI for a serving cell in:

measResultServingCellIntraFreq SEQUENCE (SIZE (1..maxNrofServingCells)) OF MeasResultNR This indicates a SEQUENCE (some kind of list in ASN.1 in RRC) where in each element there will be the measurements per PCI for that serving cell/frequency/measurement object. Then, each element for the per-PCI measurements is an IE MeasResultNR. The WD 22 may include the associated PCI within the field physCellId (or equivalent). Other measurements for that PCI may also be included therein.

Some embodiments include beam measurements (or beam measurement information) as shown below:

```
MeasResults ::=                         SEQUENCE {
measId                              MeasId,
measResultServingMOList                     MeasResultServMOList,
[...]
}
MeasResultServMOList ::=                    SEQUENCE (SIZE (1..maxNrofServingCells))
OF MeasResultServMO
MeasResultServMO ::=                       SEQUENCE {
servCellId                          ServCellIndex,
measResultServingCell                     MeasResultNR,
measResultServingCellIntraFreq                  SEQUENCE (SIZE
(1..maxNrofServingCells)) OF MeasResultNR,
measResultBestNeighCell                    MeasResultNR   OPTIONAL,
...
}
MeasResultNR ::=                         SEQUENCE {
physCellId                          PhysCellId OPTIONAL,
measResult                          SEQUENCE {
cellResults                         SEQUENCE{
   resultsSSB-Cell                          MeasQuantityResults OPTIONAL,
   resultsCSI-RS-Cell                        MeasQuantityResults OPTIONAL
},
rsIndexResults                        SEQUENCE{
   resultsSSB-Indexes                        ResultsPerSSB-IndexList OPTIONAL,
   resultsCSI-RS-Indexes                      ResultsPerCSI-RS-IndexList OPTIONAL
}  OPTIONAL
},
[...]
}
```

| Meas ResultNR field descriptions |
| --- |
| [. . .]<br>cellResults<br>Cell level measurement results.<br>[. . .]<br>physCellId<br>The physical cell identity of the NR cell for which the reporting is being performed. In the case of a serving cell with multiple PCIs, that is also included for serving cell measurements. |

In some embodiments, for each measurement (or set of measurement associated to a PCI) per PCI, the WD 22 includes in the measurement report a Serving Cell Index associated with the corresponding PCI. This correspondence of mapping between PCI and Serving Cell Index is provided as part of the WD 22 configuration. In some known methods, the Pcell and each Scell is associated to a Serving cell index (e.g., an integer identifying the serving cell encoded with fewer bits than the PCI).

In some embodiments, for each measurement per PCI, the WD 22 includes in the measurement report a servingCellIndex which is configured as part of the WD 22 configuration. In some known methods, there can be at most one servingCellIndex per measurement object whereas in some embodiments disclosed herein there will be one-to-many relation between a measurement object and the serving cell indices.

A method of cell quality derivation concerns the usage of the different PCI(s) with which the WD 22 is configured. Some embodiments provide methods related to the serving cell measurements included in the measurement report sent by the WD 22.

In the embodiments, the WD 22 may treat the non-serving PCIs that are part of TCI state configurations (those that are not currently associated with the serving PCI and for which the L1/L2 centric mobility is enabled) as blacklisted PCIs. The blacklisting may be from the event evaluation point of view and from the reporting point of view. In some embodiments, the WD 22 would treat the additional PCIs (those that are not currently associated to the serving PCI and for which the L1/L2 centric mobility is enabled) for only measurement reporting purposes. So, the backlisting of other PCIs for which L1/L2 centric mobility could be enabled may be only applicable for event triggering evaluation criterion but not for measurement reporting criteria.

The WD 22 could further include one or more of the following in the measurement report:

- the set of PCIs and the associated beam measurements are included; in some examples, the set of PCIs and the associated beam measurements are explicitly configured in the serving cell related measurement object.
- per-PCI level measurements associated with the PCIs within which the L1/L2 centric mobility is enabled and associated with those PCIs that are currently being considered as part of the serving cell quality derivation. For example, the WD 22 may be configured with PCI-1, PCI-2 and PCI-3 as the PCIs associated to the L1/L2 centric mobility. The WD 22 may be further configured with a serving cell quality derivation method associated to combining the measurements of beams belonging to the multiple PCIs (one of the methods provided further below). For example, the number of PCIs to combine (in the method titled 'L1 level beam (e.g., SSB) consolidation per PCI and further consolidation of cell quantities belonging to different PCIs' below) is configured as two. In such a scenario, the WD 22 may select the two strongest PCI specific measurements to derive the serving cell quality (e.g., PCI-1 and PCI-3). In such a scenario, the WD 22 may also include the cell level and beam level measurements associated to PCI-1 and PCI-3 as part of the measResultServingPCIList.

```
MeasResultServMOList ::=            SEQUENCE (SIZE (1..maxNrofServingCells))
OF MeasResultServMO
MeasResultServMO ::=               SEQUENCE {
servCellId                  ServCellIndex,
measResultServingCell            MeasResultNR,
   measResultServingPCIList                            SEQUENCE (SIZE
   (1..maxNrofServingCells)) OF MeasResultNR             OPTIONAL,
measResultBestNeighCell              MeasResultNR
OPTIONAL,
...
}
MeasResultNR ::=                SEQUENCE {
physCellId                  PhysCellId OPTIONAL,
measResult                  SEQUENCE {
cellResults                 SEQUENCE{
   resultsSSB-Cell                      MeasQuantityResults OPTIONAL,
   resultsCSI-RS-Cell                     MeasQuantityResults OPTIONAL
},
rsIndexResults                SEQUENCE{
   resultsSSB-Indexes                     ResultsPerSSB-IndexList OPTIONAL,
   resultsCSI-RS-Indexes                    ResultsPerCSI-RS-IndexList OPTIONAL
}   OPTIONAL
},[...]}
```

In some embodiments, the WD 22 may still perform individual PCI related measurements for measurement reporting along with combined cell quality derivation which is used for both event criterion evaluation and measurement reporting.

The WD 22 may perform the cell quality derivation of the serving cell based on at least one of the following:

L1 level beam (e.g., SSB) consolidation belonging to multiple PCIs—

In this method, the beams (e.g., SSBs) associated with all configured PCIs (e.g., included in different TCI states) are combined into a serving cell measurement like serving cell RSRP, serving cell RSRQ or serving cell SINR. However, the measurements associated with individual PCIs are still computed for the measurement reporting purposes;

In some embodiments, the beam consolidation/selection parameters configured for the multi PCI consolidation configured differently than the beam consolidation/selection parameters configured for the individual PCI related measurements associated with PCIs for which the L1/L2 mobility is enabled. This in turn is configured differently than the beam consolidation/selection parameters configured for the neighbour cell related cell quality derivation; and/or In some embodiments, the beam consolidation/selection parameters configured for the multi PCI consolidation, the beam consolidation/selection parameters configured for the individual PCI related measurements associated to PCIs for which the L1/L2 mobility is enabled, and the beam consolidation/selection parameters configured for the neighbour cell related cell quality derivation are the same.

In some embodiments, at least two of the following are the same:

The beam consolidation/selection parameters configured for the multi PCI consolidation;

The beam consolidation/selection parameters configured for the individual PCI related measurements associated to PCIs for which the L1/L2 mobility is enabled; and/or The beam consolidation/selection parameters configured for the neighbour cell.

In some embodiments, after the WD 22 obtains L1 beam measurements (e.g., SSB measurements for the one or multiple PCIs associated with a serving cell), the WD 22 applies a beam consolidation/selection function. In some embodiments, for the PCI-specific measurements associated with the PCIs for which the WD 22 is configured with L1/L2 centric mobility, the WD 22 may derive the PCI-specific measurement quantity (e.g., RSRP, RSRQ, SINR) based on SS/PBCH block (SSB) as the highest beam measurement quantity value (out of the beam measurement quantity values of the corresponding PCI), where each beam measurement quantity is described in the 3GPP TS 38.215.

In some embodiments, for the PCI specific measurements associated with the PCIs for which the WD 22 is configured with L1/L2 centric mobility, the WD 22 is configured with parameters for the beam consolidation/selection function. The parameters for that function may be configured by the network node 16, e.g., in the measConfig IE, as part of the measurement object configuration associated with the that serving cell for which the WD 22 is performing measurements.

In some embodiments, for the PCI-specific measurements associated with the PCIs for which the WD 22 is configured with L1/L2 centric mobility, the WD 22 may derive the PCI-specific measurement quantity (e.g., RSRP, RSRQ, SINR) based on SS/PBCH blocks of the PCI as the linear power scale average of the beam measurement quantity values of up to M beams where the total number of averaged beams may not exceed M.

L1 level beam (e.g., SSB) consolidation per PCI and further consolidation of cell quantities belonging to different PCIs—In this method, the beam (e.g., SSB) level consolidation is performed for each of the configured PCIs for L1/L2 centric-mobility (e.g., each PCI included in the TCI state configurations) and then these PCI level measurements are further consolidated to produce a single measurement quantity and this measurement quantity is filtered to produce the L3 measurements. An advantage of this solution is that performing per PCI level L3 filtering may be omitted, thus reducing the processing overhead at the WD 22. The WD 22 may further use the layer-3 filtered PCI specific measurements for the measurement reporting.

L1 level beam (e.g., SSB) consolidation per PCI to produce a PCI level measurement quantity which is further filtered to produce L1 measurement results: Then, these measurements are consolidated to produce a single measurement quantity—In this method, the beam (e.g., SSB) level consolidation is performed for each of the PCI included in the TCI states of the servignCellConfigCommon and then these PCI level measurements are further consolidated to produce a single measurement quantity and this measurement quantity is filtered to produce the L3 measurements. An advantage of this solution is that there is no consolidation required to be performed at the SSB level and the currently existing PCI level L3 measurements are combined to produce a single measurement quantity. Further the individual PCI related beam consolidated measurement quantities are layer-3 filtered to produce the individual PCI specific measurement quantity that is used for measurement reporting.

Different PCI(s) Handled Independently with Multiple Serving Cells on the Same Frequency for Event Evaluation In some embodiments, even if the WD 22 is configured with a serving cell associated with multiple PCIs, where each PCI may be associated with a TCI state configuration that may be indicated via L1/L2 signalling (e.g., a MAC CE for TCI state indication for WD-specific PDCCH), the WD 22 performs serving cell measurements based on each of the PCIs independently and treats these serving cell measurements independently for the configured event evaluation. An advantage of this method is that there updates from the lower layers to the higher layers when the TCI state change indicates the use of a different PCI may be omitted.

In some embodiments, the reporting of these individual PCIs is treated independently, i.e., the WD 22 does not include the measurement report related to the other PCIs associated to the L1/L2 centric mobility compared to the one that triggered the measurement report. In some other embodiments, the WD 22 includes the measurements of each of the PCIs associated to the L1/L2 centric mobility independent of which PCI triggers the measurement report.

For example, if the WD 22 receives PCI-1 and PCI-2 as part of the phyCellId in QCL-Info of the TCI-State, then the WD 22 may perform cell quality derivation of PCI-1 and PCI-2 independently and treat both of them as the serving cell measurements and perform the event evaluation based on these serving cells, independently. In some embodiments, the reporting of these two PCIs is also treated independently and the WD 22 may include the measurements of both of these PCIs in the measurement report.

In some embodiments, for each measurement report that includes serving cell measurements (for a given measId), the WD 22 includes an indication that serving cell measurements are performed based on a given PCI. In some embodiments, the absence of the indication may indicate that serving cell measurements were performed based on the PCI indicated via RRC, e.g., the one in ServingCellConfigCommon. In current 3GPP specifications, the WD 22 includes serving cell measurements in a measurement report but distinguishes different serving cells (e.g., Pcell and Scells) by associating the different serving cells measurements with a serving cell index (an integer mapped to the PCI in each serving cell configuration). However, if the same serving cell has different associated PCIs, the WD 22 may include additional information so the network node 16 (e.g., a Centralized Unit or any other network node 16 that processes L3/RRC measurement reports) is aware of the current PCI used for the cell quality derivation (CQD) of the serving cell measurements.

```
MeasResults ::=                SEQUENCE {
measId                       MeasId,
measResultServingMOList              MeasResultServMOList,
(...)
}
MeasResultServMOList ::=          SEQUENCE (SIZE (1..maxNrofServingCells))
OF MeasResultServMO
MeasResultServMO ::=            SEQUENCE {
servCellId                   ServCellIndex,
phyCellId                                                 PhysCellId
   OPTIONAL,   -- Need R
measResultServingCell           MeasResultNR,
(...)
...
}
```

Another alternative is to re-interpret the PCI that may already be included in the measurement results, except that in legacy WDs 22, the PCI is the PCI of the serving cell i.e., there is a 1-to-1 mapping.

```
MeasResultNR ::=               SEQUENCE {
physCellId                   PhysCellId
OPTIONAL,
measResult                   SEQUENCE {
cellResults                SEQUENCE{
   resultsSSB-Cell               MeasQuantityResults
   OPTIONAL,
   resultsCSI-RS-Cell               MeasQuantityResults
   OPTIONAL
```

-continued

```
},
rsIndexResults                 SEQUENCE{
   resultsSSB-Indexes                  ResultsPerSSB-IndexList
   OPTIONAL,
   resultsCSI-RS-Indexes                  ResultsPerCSI-RS-IndexList
   OPTIONAL
}                                                              OPTIONAL
},
...,
[[
cgi-Info                  CGI-InfoNR
OPTIONAL
]]
}
```

| MeasResultNR field descriptions |
|---|
| . . . |
| phys CellId<br>The physical cell identity of the NR cell for which the reporting is being performed. In the case the WD 22 is configured with multiple physical cell identities for L1/L2-centric mobility, the WD 22 includes the current's serving cell physical cell identity (PCI) i.e., the PCI associated to the latest TCI state indicated via MAC CE. |

Another alternative to enable the central unit (CU) to interpret measurement reports is to determine a change in serving cell's PCI at the network node 16, i.e., the DU indicates to the CU every time a change in the serving cell's PCI is performed with MAC CE Associated with the measurements included in the measurement report, the WD 22 may include per-PCI level measurements associated with the PCIs within which the L1/L2 centric mobility is enabled. In some embodiments, the maximum number of PCIs related to L1/L2 centric mobility to be included in the measurement report is limited by an explicit configuration (e.g., number of cell level measurements to be restricted by maxReportIntraFreqServCellPCIs). In such embodiments, the WD 22 may report the strongest PCIs up to the maximum number configured.

One or more of the following measurements may be included in the measurement report, in some embodiments:

i. The individual PCI related measurement of the currently serving PCI, i.e., the PCI associated to the TCI state currently being used by the WD 22 at the time of transmitting the measurement report;

ii. Individual PCI level measurements related to each of the multiple PCIs amongst which the WD 22 can move around with L1/L2 signaling. This embodiment has at least the advantage that filter by the WD 22 of measurements may be omitted and the WD 22 may include all L1/L2 centric PCI related measurements in the measurement report. However, a possible limitation is that the report size may be large, thereby consuming radio resources;

iii. Individual PCI level measurements related to multiple PCIs for which the WD 22 can move around with L1/L2 signaling that are above a certain threshold. In an embodiment, the threshold is explicitly configured as part of the measurement configuration. This embodiment has at least the advantage that the WD 22 includes only those cells that could be of relevance for L1/L2 centric mobility. However, a limitation may be that the WD 22 may need to perform the filtering of the measurements to check if the corresponding PCI related measurements are to be included in the measurement report or not;

iv. Individual PCI level measurements related to multiple PCIs for which the WD 22 can move around with L1/L2 signaling and those that are configured to be included in the measurement report explicitly. This embodiment has at least an advantage that the WD 22 includes only those cells that could be of relevance for L1/L2 centric mobility as configured by the network node 16. The WD 22 could treat all the other PCI related measurements to be different.

Per-Beam Level Measurements Associated to the PCIs within which the L1/L2 Centric Mobility is Enabled The beam measurements in the following embodiments refer to the SSB level measurements and/or layer-3 CSI-RS level measurements. By enabling the beam level measurements from each of the PCIs, the network node 16 may perform triangulation-based positioning (e.g., if these PCIs are non-co-located). The network node 16 may get beam specific action (e.g., if the WD 22 reports beam-X in cell-Y, then the most likely handover candidate is neighbor cell-Z compared to the WD 22 reports beam-Y in cell-Y, then the most likely handover candidate is neighbor cell-A), building beam level coverage maps, etc.

In some embodiments, the maximum number of PCIs related to L1/L2 centric mobility to be included in the measurement report is limited by the explicit configuration (e.g., the number of beam level measurements to be restricted by maxReportBeamsIntraFreqServCellPCIs). In such embodiments, the WD 22 reports the strongest beams up to the maximum number as configured. In some embodiments, this maximum number is configured per PCI that is included. In some embodiments, this maximum number is configured across all the PCIs that are part of L1/L2 centric inter-cell mobility.

Some of the embodiments related to the different ways in which the beam level measurements may include the following:

Beam level measurements related to the currently serving PCI i.e., the PCI associated with the TCI state currently being used by the WD 22 at the time of transmitting the measurement report;

Beam level measurements related to each of the multiple PCIs for which the WD 22 can move around with L1/L2 signaling;

Beam level measurements related to multiple PCIs for which the WD 22 can move around with L1/L2 signaling that are above a certain threshold. In some embodiments, the threshold is explicitly configured as part of the measurement configuration;

Beam level measurements related to multiple PCIs for which the WD 22 can move around with L1/L2 signaling and those that are explicitly configured to be included in the measurement report;

The beam measurements included in the measurement report as listed above can be associated with the list of PCIs configured in the TCI state configuration of the WD 22 or can be explicitly configured in the serving cell related measurement object:

(TS 38.331)

5.5.3 Performing Measurements 5.5.3.1 General

An RRC_CONNECTED WD 22 may derive cell measurement results by measuring one or multiple beams associated per cell as configured by the network node 16, as described in 5.5.3.3. ( . . . )

( . . . )

The WD 22 shall:

whenever the WD 22 has a measConfig, perform RSRP and RSRQ measurements for each serving cell for which servingCellMO is configured as follows:

if the reportConfig associated with at least one measId included in the measIdList within VarMeasConfig contains an rsType set to ssb and ssb-ConfigMobility is configured in the measObject indicated by the servingCellMO:

( . . . )

derive serving cell measurement results based on SS/PBCH block, as described in 5.5.3.3;

if the reportConfig associated with at least one measId included in the measIdList within VarMeasConfig contains an rsType set to csi-rs and CSI-RS-ResourceConfigMobility is configured in the measObject indicated by the servingCellMO:

( . . . )

derive serving cell measurement results based on CSI-RS, as described in 5.5.3.3;

for each serving cell for which servingCellMO is configured, if the reportConfig associated with at least one measId included in the measIdList within VarMeasConfig contains SINR as trigger quantity and/or reporting quantity:

if the reportConfig contains rsType set to ssb and ssb-ConfigMobility is configured in the servingCellMO:

( . . . )

derive serving cell SINR based on SS/PBCH block, as described in 5.5.3.3;

( . . . )

if the reportConfig contains rsType set to csi-rs and CSI-RS-ResourceConfigMobility is configured in the servingCellMO:

( . . . )

derive serving cell SINR based on CSI-RS, as described in 5.5.3.3;

( . . . )

5.5.3.3 Derivation of Cell Measurement Results ( . . . )

The WD 22 shall:

for each cell measurement quantity to be derived based on SS/PBCH block:

if nrofSS-BlocksToAverage is not configured in the associated measObject in RRC_CONNECTED or in the associated entry in measIdleCarrierListNR within VarMeasIdleConfig in RRC_IDLE/RRC_INACTIVE; or if absThreshSS-Blocks Consolidation is not configured in the associated measObject in RRC_CONNECTED or in the associated entry in measIdleCarrierListNR within VarMeasIdleConfig in RRC_IDLE/RRC_INACTIVE; or 2> if the highest beam measurement quantity value is below or equal to absThreshSS-BlocksConsolidation:

if the WD 22 is configured with multiple PCIs (for L1/L2-centric mobility) and this is a serving cell measurement:

for each of the configured PCIs for L1/L2-centric mobility, perform the following:

derive each cell measurement quantity using the PCI based on SS/PBCH block as the highest beam measurement quantity value, where each beam measurement quantity is described in TS 38.215 [9];

else:

derive each cell measurement quantity based on SS/PBCH block as the highest beam measurement quantity value, where each beam measurement quantity is described in TS 38.215 [9];

2> else:

if the WD 22 is configured with multiple PCIs (for L1/L2-centric mobility) and this is a serving cell measurement:

for each of the configured PCIs for L1/L2-centric mobility, perform the following:

derive each cell measurement quantity using the PCI based on SS/PBCH block as the linear power scale average of the highest beam measurement quantity values above absThreshSS-BlocksConsolidation where the total number of averaged beams may not exceed nrofSS-BlocksToAverage;

else:

derive each cell measurement quantity based on SS/PBCH block as the linear power scale average of the highest beam measurement quantity values above absThreshSS-BlocksConsolidation where the total number of averaged beams may not exceed nrofSS-BlocksToAverage;

2> if in RRC_CONNECTED, apply layer 3 cell filtering as described in 5.5.3.2; ( . . . )

The phrase "a serving cell associated with multiple PCI(s)" includes both solutions for L1/L2-centric inter-cell mobility. For Solution 1), the different PCIs are associated to one cell; that one cell has a first PCI and a set of additional PCIs; Update of PCI does not mean a change of cell;

For Solution 2), the different PCIs are associated to different cells; the WD 22 still connects to one cell, and that one cell has a first PCI. In that one cell, the WD 22 is configured with a set of additional PCIs (each associated to another cell); aAn update of PCI means a change of serving cell.

In some embodiments, each PCI update within the same serving cell does not lead to an update on the way the WD 22 performs its serving cell measurements. The WD 22 performs the serving cell measurements independently based on each of the PCIs included in the TCI state configuration included in servingCellConfigCommon.

The CQD method described herein may impact the event definition in at least one of the following ways:

A1 event (Serving becomes better than threshold):

The WD 22 considers the A1 event entering condition to be fulfilled if at least one of the intra-frequency serving cell measurement satisfies the event entering condition;

The WD 22 considers the A1 event entering condition to be fulfilled if the strongest of the intra-frequency serving cell measurement satisfies the event entering condition;

The WD 22 considers the A1 event entering condition to be fulfilled if the weakest of the intra-frequency serving cell measurement satisfies the event entering condition;

The WD 22 considers the A1 event leaving condition to be fulfilled if all the intra-frequency serving cells' measurements satisfies the event leaving condition;

The WD 22 considers the A1 event leaving condition to be fulfilled if the strongest of intra-frequency serving cells' measurements satisfies the event leaving condition; and/or The WD 22 considers the A1 event leaving condition to be fulfilled if the weakest of intra-frequency serving cells' measurements satisfies the event leaving condition;

A2 event (Serving becomes worse than threshold):

The WD 22 considers the A2 event entering condition to be fulfilled if all of the intra-frequency serving cells' measurements satisfies the event entering condition;

The WD 22 considers the A2 event entering condition to be fulfilled if the strongest of the intra-frequency serving cells' measurements satisfies the event entering condition;

The WD 22 considers the A2 event entering condition to be fulfilled if the weakest of the intra-frequency serving cells' measurements satisfies the event entering condition. This could be used for updating the list of PCIs within which the WD 22 can perform the L1 based inter PCI mobility;

The WD 22 considers the A2 event leaving condition to be fulfilled if at least one of the intra-frequency serving cell's measurement satisfies the event leaving condition;

The WD 22 considers the A2 event leaving condition to be fulfilled if the strongest of the intra-frequency serving cell's measurement satisfies the event leaving condition; and/or The WD 22 considers the A2 event leaving condition to be fulfilled if the weakest of the intra-frequency serving cell's measurement satisfies the event leaving condition.

A3 event (Neighbor becomes offset better than SpCell):

The WD 22 uses the strongest intra-frequency serving cell measurement for representing the SpCell in the A3 event evaluation. For example, if the neighbor cell measurement becomes offset (+hysteresis) better than the strongest intra-frequency serving cell measurement, then the WD 22 considers the A3 event entering condition to be met. This is used to enable mobility between the cells within the currently configured L1 mobility region and the region outside of this; and/or The WD 22 uses the weakest intra-frequency serving cell measurement for representing the SpCell in the A3 event evaluation. For example, if the neighbor cell measurement becomes offset (+hysteresis) better than the weakest intra-frequency serving cell measurement, then the WD 22 considers the A3 event entering condition to be met. This can be used for updating the list of PCIs within which the WD 22 can perform the L1 based inter PCI mobility;

A5 event (SpCell becomes worse than threshold) and neighbor becomes better than threshold2):

The WD 22 uses the strongest intra-frequency serving cell measurement for representing the SpCell in the A5 event evaluation; and/or The WD 22 uses the weakest intra-frequency serving cell measurement for representing the SpCell in the A5 event evaluation;

A6 event (Neighbor becomes offset better than Scell):

The WD 22 uses the strongest intra-frequency serving cell measurement for representing the Scell in the A6 event evaluation; and/or The WD 22 uses the weakest intra-frequency serving cell measurement for representing the Scell in the A6 event evaluation;

B2 event (Pcell becomes worse than threshold) and inter RAT neighbor becomes better than threshold2):

The WD 22 uses the strongest intra-frequency serving cell measurement for representing the Pcell in the B2 event evaluation; and/or The WD 22 uses the weakest intra-frequency serving cell measurement for representing the Pcell in the B2 event evaluation.

The measurement report sent by the WD 22 that includes the serving cell whose cell quality is derived based on this method may include one or more of the following embodiments:

The WD 22 includes a list of intra frequency serving cell measurements which includes the measurements associated to the PCIs amongst which the WD 22 is configured to enable the L1 based mobility.

```
MeasResults ::=                          SEQUENCE {
measId                                  MeasId,
measResultServingMOList                         MeasResultServMOList,
measResultNeighCells                        CHOICE {
measResultListNR                          MeasResultListNR,
...,
measResultListEUTRA                          MeasResultListEUTRA,
measResultListUTRA-FDD-r16                          MeasResultListUTRA-FDD-r16
}
OPTIONAL,
...,
[[
measResultServFreqListEUTRA-SCG                          MeasResultServFreqListEUTRA-SCG
OPTIONAL,
measResultServFreqListNR-SCG                          MeasResultServFreqListNR-SCG
OPTIONAL,
```

-continued

```
measResultSFTD-EUTRA                    MeasResultSFTD-EUTRA
OPTIONAL,
measResultSFTD-NR                    MeasResultCellSFTD-NR
OPTIONAL
]],
[[
measResultCellListSFTD-NR                    MeasResultCellListSFTD-NR
OPTIONAL
]],
[[
measResultForRSSI-r16                    MeasResultForRSSI-r16
OPTIONAL,
locationInfo-r16                    LocationInfo-r16
OPTIONAL,
ul-PDCP-DelayValueResultList-r16                    UL-PDCP-DelayValueResultList-r16
OPTIONAL,
measResultsSL-r16                    MeasResultsSL-r16
OPTIONAL,
measResultCLI-r16                    MeasResultCLI-r16
OPTIONAL
]]
}
MeasResultServMOList ::=                    SEQUENCE (SIZE (1..maxNrofServingCells))
OF MeasResultServMO
MeasResultServMO ::=                    SEQUENCE {
servCellId                    ServCellIndex,
  individualPCIMeasurements
    IndividualPCIMeasurements,
measResultServingCell                    MeasResultNR,
measResultBestNeighCell                    MeasResultNR
OPTIONAL,
...
}
IndividualPCIMeasurements ::=                    SEQUENCE (SIZE
(1..maxNrofL1ServingCells)) OF MeasResultNR
```

Other uses of additional PCI specific measurements associated with the PCIs for which L1/L2 centric mobility is enabled are considered. Some methods address how the WD 22 performs individual PCI specific measurements associated with the PCIs for which L1/L2 centric mobility is enabled. The scenarios where these PCI specific measurements are reported due to the triggering of a measurement events may be addressed in some embodiments described herein. In addition, there may be other scenarios where the WD 22 transmits PCI specific measurements to the network node 16, performed according to the method, such as at least one of the following:

RLF report;

MCG Failure report;

SCG failure report; and/or

A measurement report is transmitted via the MCG while the WD 22 is in MR-DC.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a wireless device (WD) configured with a plurality of Physical Cell Identities (PCIs) for a mobility procedure, the WD being configured to communicate with a network node with one or more cells operating in a same serving frequency, each cell associated with one or more PCIs, the method comprising:

receiving a reporting configuration to configure the WD to report at least one cell measurement in a measurement report, the at least one cell measurement being associated with a subset of PCIs of the plurality of PCIs;

performing the at least one cell measurement; and transmitting the measurement report to the network node, the measurement report including the at least one cell measurement and being configured according to the reporting configuration, wherein the reporting configuration includes configuring the measurement report to report a cell measurement associated with a current PCI of a cell, the current PCI being associated with a transmission configuration indicator, TCI, state currently used to serve the WD.

2. The method of claim 1, further comprising determining whether to trigger an event for measurement reporting, based at least in part on the at least one cell measurement.

3. The method of claim 1, wherein the subset of PCIs comprises a single PCI.

4. The method of claim 3, further comprising performing a cell measurement for the single PCI and including the cell measurement associated with the single PCI.

5. The method of claim 1, wherein the reporting configuration indicates the subset of PCIs.

6. The method of claim 1, further comprising performing cell measurements for each PCI in the subset of PCIs and including each cell measurement associated with a respective PCI in the measurement report.

7. The method of claim 6, wherein performing the at least one cell measurement comprises performing one of a reference signal received power, RSRP, measurement, a reference signal received quality, RSRQ, measurement and a signal to interference plus noise ratio, SINR, measurement.

8. The method of claim 1, wherein the reporting configuration includes configuring the measurement report to include no cell measurement for the current PCI of a cell.

9. The method of claim 1, wherein the measurement report indicates a PCI for which the associated cell measurement is a strongest cell measurement of the at least one cell measurement.

10. The method of claim 1, wherein the measurement report indicates whether the current PCI is an initial PCI associated with a TCI configuration received by the WD as part of a dedicated serving cell configuration message.

11. The method of claim 1, wherein the measurement report indicates whether a PCI associated with a reported cell measurement is the current PCI of a serving cell.

12. The method of claim 1, wherein a number of cell measurements to be included in the measurement report is limited to a maximum number.

13. The method of claim 1, wherein the measurement report includes a group of at least one cell measurement having a magnitude that exceeds a threshold.

14. The method of claim 13, wherein a different threshold is applied for different types of cell measurements.

15. A wireless device (WD), the WD configured with a plurality of Physical Cell Identities (PCIs) for a mobility procedure, the WD being configured to communicate with a network node with one or more cells operating in a same serving frequency, each cell associated with one or more PCIs, the wireless device comprising processing circuitry and network interfaces configured to:

receive a reporting configuration to configure the WD to report at least one cell measurement in a measurement report, the at least one cell measurement being associated with a subset of PCIs of the plurality of PCIs;

perform the at least one cell measurement; and transmit the measurement report to the network node, the measurement report including the at least one cell measurement and being configured according to the reporting configuration, wherein the reporting configuration includes configuring the measurement report to report a cell measurement associated with a current PCI of a cell, the current PCI being associated with a transmission configuration indicator, TCI, state currently used to serve the WD.

* * * * *